US011667777B2

(12) United States Patent
Lief et al.

(10) Patent No.: US 11,667,777 B2
(45) Date of Patent: Jun. 6, 2023

(54) BIMODAL POLYETHYLENE COPOLYMERS

(71) Applicant: Chevron Phillips Chemical Company LP, The Woodlands, TX (US)

(72) Inventors: Graham R. Lief, Bartlesville, OK (US); Qing Yang, Bartlesville, OK (US); Youlu Yu, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 271 days.

(21) Appl. No.: 17/160,481

(22) Filed: Jan. 28, 2021

(65) Prior Publication Data
US 2021/0147661 A1    May 20, 2021

Related U.S. Application Data

(63) Continuation-in-part of application No. 16/593,566, filed on Oct. 4, 2019, now Pat. No. 11,186,665.

(51) Int. Cl.
| | | |
|---|---|---|
| *C08L 23/08* | (2006.01) | |
| *C08F 4/653* | (2006.01) | |
| *C08F 4/6592* | (2006.01) | |
| *C08F 210/16* | (2006.01) | |
| *C08F 2/34* | (2006.01) | |
| *C08F 4/659* | (2006.01) | |

(52) U.S. Cl.
CPC ............ *C08L 23/0815* (2013.01); *C08F 2/34* (2013.01); *C08F 4/65904* (2013.01); *C08F 4/65912* (2013.01); *C08F 4/65925* (2013.01); *C08F 4/65927* (2013.01); *C08F 210/16* (2013.01); *C08F 2420/00* (2013.01); *C08L 2207/062* (2013.01)

(58) Field of Classification Search
CPC .............. C08F 4/65904; C08F 4/65925; C08F 4/65927; C08F 210/16; C08L 23/0815
See application file for complete search history.

(56) References Cited

U.S. PATENT DOCUMENTS

| | | | |
|---|---|---|---|
| 3,107,230 | A | 10/1963 | Malz |
| 3,242,099 | A | 3/1966 | Manyik |
| 3,248,179 | A | 4/1966 | Norwood |
| 4,501,885 | A | 2/1985 | Sherk |
| 4,794,096 | A | 12/1988 | Ewen |
| 4,808,561 | A | 2/1989 | Welborn, Jr. |
| 5,565,175 | A | 10/1996 | Hottovy |
| 5,575,979 | A | 11/1996 | Hanson |
| 5,576,259 | A | 11/1996 | Hasegawa |
| 5,807,938 | A | 9/1998 | Kaneko |
| 5,919,983 | A | 7/1999 | Rosen |
| 5,925,717 | A | 7/1999 | De Boer |
| 5,969,070 | A | 10/1999 | Waymouth |
| 6,107,230 | A | 8/2000 | McDaniel |
| 6,165,929 | A | 12/2000 | McDaniel |
| 6,239,235 | B1 | 5/2001 | Hottovy |
| 6,262,191 | B1 | 7/2001 | Hottovy |
| 6,262,201 | B1 | 7/2001 | Welch |
| 6,294,494 | B1 | 9/2001 | McDaniel |
| 6,300,271 | B1 | 10/2001 | McDaniel |
| 6,316,553 | B1 | 11/2001 | McDaniel |
| 6,355,594 | B1 | 3/2002 | McDaniel |
| 6,376,415 | B1 | 4/2002 | McDaniel |
| 6,388,017 | B1 | 5/2002 | McDaniel |
| 6,391,816 | B1 | 5/2002 | McDaniel |
| 6,395,666 | B1 | 5/2002 | McDaniel |
| 6,479,685 | B2 | 11/2002 | Waymouth |
| 6,524,987 | B1 | 2/2003 | Collins |
| 6,548,441 | B1 | 4/2003 | McDaniel |
| 6,548,442 | B1 | 4/2003 | McDaniel |
| 6,576,583 | B1 | 6/2003 | McDaniel |
| 6,596,891 | B1 | 7/2003 | Sommazzi |
| 6,613,712 | B1 | 9/2003 | McDaniel |
| 6,632,894 | B1 | 10/2003 | McDaniel |

(Continued)

FOREIGN PATENT DOCUMENTS

| | | |
|---|---|---|
| EP | 0798306 B1 | 5/2002 |
| WO | 2021067148 A1 | 4/2021 |

OTHER PUBLICATIONS

International Search Report and Written Opinion issued in corresponding application No. PCT/US2022/070392 dated May 17, 2022, 15 pp.

Jany, et. al. "para-Fluoro benzyl substituted bisindenyl/metallocenes as catalyst precursors in ethene polymerization", Journal of Organometallic Chemistry, vol. 553, Issues 1-2, Feb. 25, 1998, pp. 173-178 (University of Helsinki). https://doi.org/10.1016/S0022-328X(97)00625-6.

Bird, R. Byron, et al., "Dynamics of Polymeric Liquids," Fluid Mechanics, vol. 1, Second Edition, 1987, cover page, publishing page, pp. xiii-xviii, and 171-172, John Wiley & Sons, Inc.

Cotton, F. Albert, et al., "Advanced Inorganic Chemistry," Sixth Edition, cover page, title page, pp. ix-x, and book description, Mar. 30, 1999, John Wiley & Sons, Inc.

Film Extrusion Manual—Process, Materials, Properties, TAPPI Press, 1992, 16 pages.

(Continued)

*Primary Examiner* — Caixia Lu
(74) *Attorney, Agent, or Firm* — Merchant & Gould P.C.

(57) ABSTRACT

Ethylene-based polymers are characterized by a density from 0.92 to 0.955 g/cm$^3$, a HLMI of less than 35 g/10 min, and a ratio of a number of short chain branches (SCBs) per 1000 total carbon atoms at Mz to a number of SCBs per 1000 total carbon atoms at Mn in a range from 11.5 to 22. These polymers can have a higher molecular weight (HMW) component and a lower molecular weight (LMW) component, in which a ratio of a number of SCBs per 1000 total carbon atoms at Mn of the HMW component to a number of SCBs per 1000 total carbon atoms at Mn of the LMW component is in a range from 10.5 to 22. These ethylene polymers can be produced using a dual catalyst system containing an unbridged metallocene compound with an indenyl group having at least one halogen-substituted hydrocarbyl substituent with at least two halogen atoms, and a single atom bridged metallocene compound with a fluorenyl group and a cyclopentadienyl group.

20 Claims, 4 Drawing Sheets

(56) References Cited

U.S. PATENT DOCUMENTS

| | | |
|---|---|---|
| 6,667,274 B1 | 12/2003 | Hawley |
| 6,750,302 B1 | 6/2004 | McDaniel |
| 6,831,141 B2 | 12/2004 | McDaniel |
| 6,833,415 B2 | 12/2004 | Kendrick |
| 6,936,667 B2 | 8/2005 | Jensen |
| 6,992,032 B2 | 1/2006 | McDaniel |
| 7,026,494 B1 | 4/2006 | Yang |
| 7,041,617 B2 | 5/2006 | Jensen |
| 7,064,225 B2 | 6/2006 | Thorn |
| 7,081,505 B2 | 7/2006 | Sommazzi |
| 7,148,298 B2 | 12/2006 | Jensen |
| 7,199,073 B2 | 4/2007 | Martin |
| 7,226,886 B2 | 6/2007 | Jayaratne |
| 7,294,599 B2 | 11/2007 | Jensen |
| 7,312,283 B2 | 12/2007 | Martin |
| 7,470,758 B2 | 12/2008 | Jensen |
| 7,501,372 B2 | 3/2009 | Thorn |
| 7,517,939 B2 | 4/2009 | Yang |
| 7,521,572 B2 | 4/2009 | Jayaratne |
| 7,576,163 B2 | 8/2009 | Yang |
| 7,601,665 B2 | 10/2009 | McDaniel |
| 7,619,047 B2 | 11/2009 | Yang |
| 7,629,284 B2 | 12/2009 | Jensen |
| 7,652,160 B2 | 1/2010 | Yang |
| 7,732,542 B2 | 6/2010 | Yang |
| 7,763,561 B2 | 7/2010 | McDaniel |
| 7,884,163 B2 | 2/2011 | McDaniel |
| 7,910,763 B2 | 3/2011 | Jayaratne |
| 7,960,487 B2 | 6/2011 | Yang |
| 8,138,113 B2 | 3/2012 | Yang |
| 8,153,043 B2 | 4/2012 | Krishnaswamy |
| 8,268,944 B2 | 9/2012 | Yang |
| 8,268,984 B2 | 9/2012 | Tourniaire |
| 8,288,487 B2 | 10/2012 | Yang |
| 8,309,485 B2 | 11/2012 | Yang |
| 8,318,873 B2 | 11/2012 | Jayaratne |
| 8,318,883 B1 | 11/2012 | Yang |
| 8,383,754 B2 | 2/2013 | Yang |
| 8,450,437 B2 | 5/2013 | Yang |
| 8,507,621 B2 | 8/2013 | Jayaratne |
| 8,623,973 B1 | 1/2014 | McDaniel |
| 8,637,691 B2 | 1/2014 | Yang |
| 8,703,886 B1 | 4/2014 | Yang |
| 8,822,608 B1 | 9/2014 | Bhandarkar |
| 8,912,285 B2 | 12/2014 | Yang |
| 9,023,959 B2 | 5/2015 | McDaniel |
| 9,156,970 B2 | 10/2015 | Hlavinka |
| 9,217,049 B2 | 12/2015 | Yang |
| 9,346,896 B2 | 5/2016 | McDaniel |
| 9,475,898 B2 | 10/2016 | Rohatgi |
| 9,605,100 B2 | 3/2017 | Hlavinka |
| 9,670,296 B2 | 6/2017 | McDaniel |
| 10,239,975 B2 | 3/2019 | McDaniel |
| 10,676,553 B2 | 6/2020 | McDaniel |
| 10,919,996 B2 | 2/2021 | McDaniel |
| 2001/0049425 A1 | 12/2001 | Waymouth |
| 2007/0043176 A1 | 2/2007 | Martin |
| 2007/0060722 A1 | 3/2007 | Jayaratne |
| 2007/0197374 A1 | 8/2007 | Yang |
| 2009/0240010 A1 | 9/2009 | McDaniel |
| 2010/0076167 A1 | 3/2010 | McDaniel |
| 2015/0065669 A1 | 3/2015 | Hlavinka |
| 2015/0126692 A1* | 5/2015 | Sukhadia ............ C08L 23/0815 526/64 |
| 2018/0305532 A1 | 10/2018 | Zhang |
| 2019/0100606 A1* | 4/2019 | Ding ..................... C08J 5/18 |
| 2019/0135960 A1 | 5/2019 | Kazemi |
| 2020/0207892 A1 | 7/2020 | McDaniel |
| 2021/0102017 A1 | 4/2021 | Lief |
| 2021/0147661 A1 | 5/2021 | Lief |

OTHER PUBLICATIONS

Hawley's Condensed Chemical Dictionary, Eleventh Edition, cover page, contents page, pp. 862-863, Van Nostrand Reinhold Company.

Helmut G. Alt, et al., "Verbrückte Indenyliden—Cyclopentadienylidenkomplexe des Typs (C9H5CH2Ph-X-C5H4)MCl2(X=CMe2, SiMe2; M=Zr, Hf) als Metallocenkatalysatoren für die Ethylenpolymerisation. Die Molekülstrukturen von (C9H5CH2Ph—CMe2—C5H4)MCl2 (M=Zr, Hf)," Journal of Organometallic Chemistry, vol. 558, Issues 1-2; 1998; pp. 111-121.

Hieber, C. A., et al., "Shear-rate-dependence modeling of polymer melt viscosity," Polymer Engineering and Science, Jul. 1992, pp. 931-938, vol. 32, No. 14.

Hieber, C. A., et al., "Some correlations involving the shear viscosity of polystyrene melts," Rheol Acta, 1989, pp. 321-332, vol. 28.

IUPAC Compendium of Chemical Terminology, 2nd Ed. 1997, pp. 1-1670.

Juan Cámpora, et al., "Highly Fluorous Zirconocene(IV) Complexes and Their Catalytic Applications in the Polymerization of Ethylene," Journal of Organometallic Chemistry, vol. 695, 2010, pp. 1794-1800.

Matthew P. Thornberry, et al., "Synthesis, Structure, and Olefin Polymerization Catalytic Behavior of Aryl-Substituted Zirconocene Dichlorides," Organometallics, vol. 23, No. 6, 2004, pp. 1333-1339.

Modern Plastics Encyclopedia, Mid-Nov. 1995 Issue, vol. 72, No. 12, 3 pages.

Paul A. Deck, "Perfluoroaryl-Substituted Cyclopentadienyl Complexes of Transition Metals," Coordination Chemistry Reviews, 250; 2006; pp. 1032-1055.

Paul A. Deck, et al., "Synthesis of Pentafluorophenyl-Substituted Cyclopentadienes and Their Use as Transition-Metal Ligands," Organometallics, vol. 15, No. 25, 1996, pp. 5287-5291.

Paul A. Deck, et al., "Tricarbonylrhenium(I) Complexes of Pentafluorophenyl-Substituted Indenyl Ligands," Organometallics, vol. 19, No. 3, 2000, pp. 327-333.

Related U.S. Appl. No. 16/797,875, filed Feb. 21, 2020.

Related U.S. Appl. No. 17/124,605, filed Dec. 17, 2020.

Richard J. Maldanis, et al., "The Formation and Polymerization Behavior of (Pentafluorophenyl)-Cyclopentadienyl Titanium Compounds," Journal of Organometallic Chemistry, vol. 599, 2000, pp. 107-111.

Russell P. Hughes, et al., "Selective Solubility of Organometallic Complexes in Saturated Fluorocarbons. Synthesis of Cyclopentadienyl Ligands With Fluorinated Ponytails," Organometallics, vol. 15, No. 1, 1996, pp. 286-284.

* cited by examiner

BIMODAL POLYETHYLENE COPOLYMERS

REFERENCE TO RELATED APPLICATION

This application is a continuation-in-part application of U.S. patent application Ser. No. 16/593,566, filed on Oct. 4, 2019, now U.S. Pat. No. 11,186,665, the disclosure of which is incorporated herein by reference in its entirety.

FIELD OF THE INVENTION

The present disclosure generally relates to bimodal ethylene-based polymers, and more particularly, relates to such polymers that have a large majority of their short chain branch content concentrated in the high molecular weight fraction of the polymer.

BACKGROUND OF THE INVENTION

Incorporation of comonomer short chain branches (SCBs) into high density polyethylene (HDPE) copolymers and linear low density polyethylene (LLDPE) copolymers can be useful in customizing the properties of the polymer. For example, SCBs can reduce polymer crystallinity and improve impact strength, but also can decrease polymer stiffness and polymer density.

For bimodal ethylene polymers, it is often advantageous for the low molecular weight fraction of the polymer to have a low concentration of comonomer SCBs, while the high molecular weight fraction has a relatively higher concentration of comonomer SCBs. It is to these ends that the present invention is generally directed.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

The present invention generally relates, in one aspect, to ethylene-based polymers characterized by a density in a range from 0.92 to 0.955 g/cm$^3$, a HLMI of less than or equal to 35 g/10 min, and a ratio of a number of short chain branches 14-501-343 (SCBs) per 1000 total carbon atoms at Mz to a number of SCBs per 1000 total carbon atoms at Mn in a range from 11.5 to 22.

In another aspect, provided herein are ethylene polymers characterized by a density in a range from 0.92 to 0.955 g/cm$^3$, a HLMI of less than or equal to 35 g/10 min, and a higher molecular weight (HMW) component and a lower molecular weight (LMW) component, in which a ratio of a number of SCBs per 1000 total carbon atoms at Mn of the HMW component to a number of SCBs per 1000 total carbon atoms at Mn of the LMW component is in a range from 10.5 to 22.

Polymerization processes also are encompassed herein. For example, a representative polymerization process can comprise contacting a catalyst composition with ethylene and an α-olefin comonomer in a polymerization reactor system under polymerization conditions to produce an ethylene polymer, wherein the catalyst composition comprises catalyst component I comprising any unbridged metallocene compound disclosed herein, catalyst component II comprising any bridged metallocene compound disclosed herein, any activator disclosed herein, and optionally, any co-catalyst disclosed herein.

Both the foregoing summary and the following detailed description provide examples and are explanatory only. Accordingly, the foregoing summary and the following detailed description should not be considered to be restrictive. Further, features or variations may be provided in addition to those set forth herein. For example, certain aspects and embodiments may be directed to various feature combinations and sub-combinations described in the detailed description.

DEFINITIONS

Figure 1:
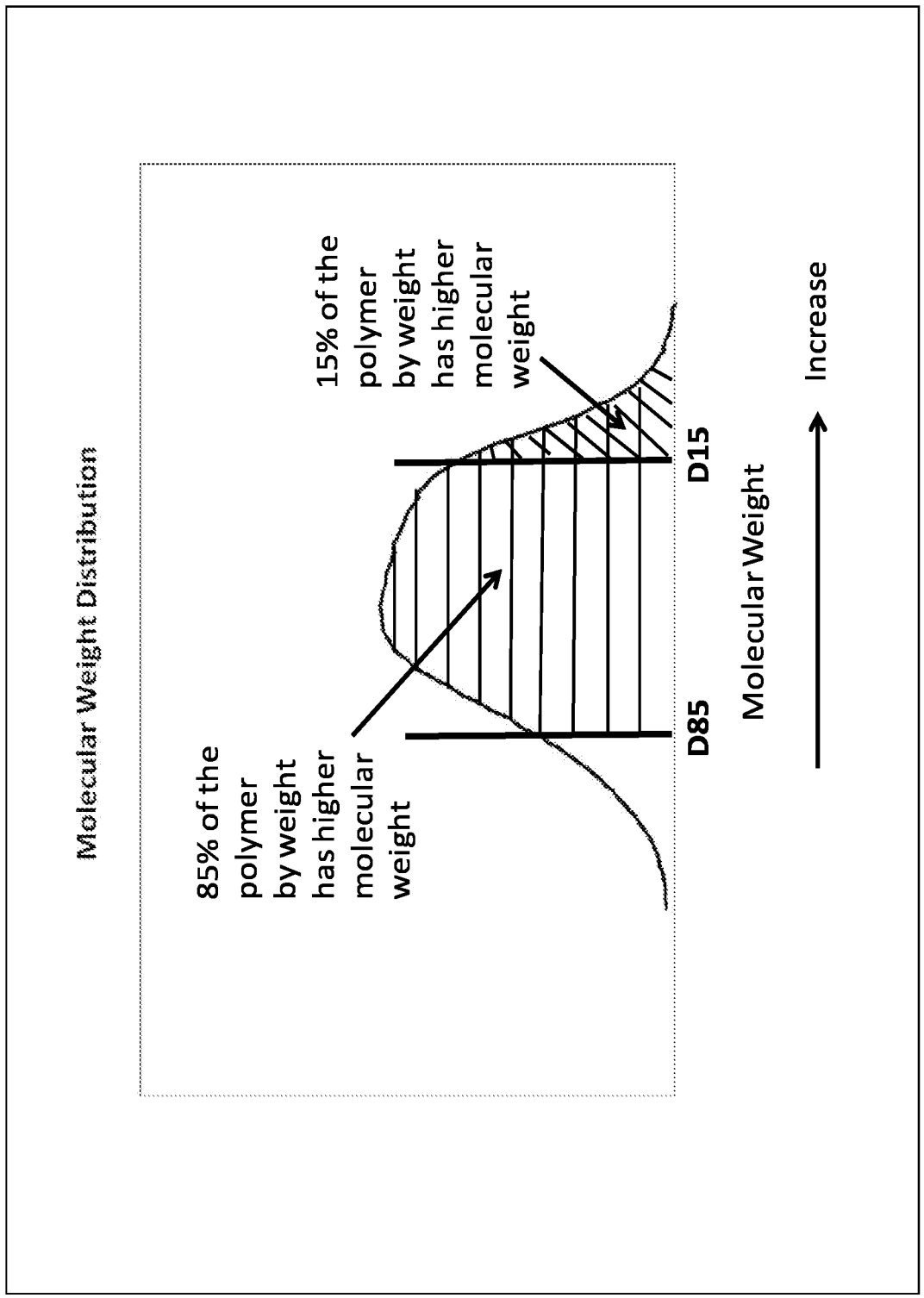
FIG. 1 illustrates the definitions of D85 and D15 on a molecular weight distribution curve.

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, 2nd Ed (1997), can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Herein, features of the subject matter are described such that, within particular aspects, a combination of different features can be envisioned. For each and every aspect and/or feature disclosed herein, all combinations that do not detrimentally affect the designs, compositions, and/or methods described herein are contemplated with or without explicit description of the particular combination. Additionally, unless explicitly recited otherwise, any aspect and/or feature disclosed herein can be combined to describe inventive features consistent with the present disclosure.

While compositions and methods are described herein in terms of "comprising" various components or steps, the compositions and methods also can "consist essentially of" or "consist of" the various components or steps, unless stated otherwise. For example, a catalyst composition consistent with aspects of the present invention can comprise; alternatively, can consist essentially of; or alternatively, can consist of; catalyst component I, catalyst component II, an activator, and a co-catalyst.

The terms "a," "an," "the," etc., are intended to include plural alternatives, e.g., at least one, unless otherwise specified. For instance, the disclosure of "a co-catalyst" or "a metallocene compound" is meant to encompass one, or mixtures or combinations of more than one, co-catalyst or metallocene compound, respectively, unless otherwise specified.

Generally, groups of elements are indicated using the numbering scheme indicated in the version of the periodic table of elements published in *Chemical and Engineering News*, 63(5), 27, 1985. In some instances, a group of elements can be indicated using a common name assigned to the group; for example, alkali metals for Group 1 elements, alkaline earth metals for Group 2 elements, transition metals for Group 3-12 elements, and halogens or halides for Group 17 elements.

For any particular compound disclosed herein, the general structure or name presented is also intended to encompass all structural isomers, conformational isomers, and stereoisomers that can arise from a particular set of substituents, unless indicated otherwise. Thus, a general reference to a compound includes all structural isomers unless explicitly indicated otherwise; e.g., a general reference to pentane includes n-pentane, 2-methyl-butane, and 2,2-dimethylpropane, while a general reference to a butyl group includes an n-butyl group, a sec-butyl group, an iso-butyl group, and a tert-butyl group. Additionally, the reference to a general structure or name encompasses all enantiomers, diastereomers, and other optical isomers whether in enantiomeric or racemic forms, as well as mixtures of stereoisomers, as the context permits or requires. For any particular formula or name that is presented, any general formula or name presented also encompasses all conformational isomers, regioisomers, and stereoisomers that can arise from a particular set of substituents.

The term "substituted" when used to describe a group, for example, when referring to a substituted analog of a particular group, is intended to describe any non-hydrogen moiety that formally replaces a hydrogen in that group, and is intended to be non-limiting. A group or groups can also be referred to herein as "unsubstituted" or by equivalent terms such as "non-substituted," which refers to the original group in which a non-hydrogen moiety does not replace a hydrogen within that group. Unless otherwise specified, "substituted" is intended to be non-limiting and include inorganic substituents or organic substituents as understood by one of ordinary skill in the art.

The term "hydrocarbon" whenever used in this specification and claims refers to a compound containing only carbon and hydrogen. Other identifiers can be utilized to indicate the presence of particular groups in the hydrocarbon (e.g., halogenated hydrocarbon indicates the presence of one or more halogen atoms replacing an equivalent number of hydrogen atoms in the hydrocarbon). The term "hydrocarbyl group" is used herein in accordance with the definition specified by IUPAC: a univalent group formed by removing a hydrogen atom from a hydrocarbon (that is, a group containing only carbon and hydrogen). Non-limiting examples of hydrocarbyl groups include alkyl, alkenyl, aryl, and aralkyl groups, amongst other groups.

The term "polymer" is used herein generically to include olefin homopolymers, copolymers, terpolymers, and the like, as well as alloys and blends thereof. The term "polymer" also includes impact, block, graft, random, and alternating copolymers. A copolymer is derived from an olefin monomer and one olefin comonomer, while a terpolymer is derived from an olefin monomer and two olefin comonomers. Accordingly, "polymer" encompasses copolymers and terpolymers derived from any olefin monomer and comonomer(s) disclosed herein. Similarly, the scope of the term "polymerization" includes homopolymerization, copolymerization, and terpolymerization. Therefore, an ethylene polymer includes ethylene homopolymers, ethylene copolymers (e.g., ethylene/α-olefin copolymers), ethylene terpolymers, and the like, as well as blends or mixtures thereof. Thus, an ethylene polymer encompasses polymers often referred to in the art as LLDPE (linear low density polyethylene) and HDPE (high density polyethylene). As an example, an olefin copolymer, such as an ethylene copolymer, can be derived from ethylene and a comonomer, such as 1-butene, 1-hexene, or 1-octene. If the monomer and comonomer were ethylene and 1-hexene, respectively, the resulting polymer can be categorized an as ethylene/1-hexene copolymer. The term "polymer" also includes all possible geometrical configurations, unless stated otherwise, and such configurations can include isotactic, syndiotactic, and random symmetries. Moreover, unless stated otherwise, the term "polymer" also is meant to include all molecular weight polymers, and is inclusive of lower molecular weight polymers.

The term "co-catalyst" is used generally herein to refer to compounds such as aluminoxane compounds, organoboron or organoborate compounds, ionizing ionic compounds, organoaluminum compounds, organozinc compounds, organomagnesium compounds, organolithium compounds, and the like, that can constitute one component of a catalyst composition, when used, for example, in addition to an activator-support. The term "co-catalyst" is used regardless of the actual function of the compound or any chemical mechanism by which the compound may operate.

The term "activator-support" is used herein to indicate a solid, inorganic oxide of relatively high porosity, which can exhibit Lewis acidic or Brønsted acidic behavior, and which has been treated with an electron-withdrawing component, typically an anion, and which is calcined. The electron-withdrawing component is typically an electron-withdrawing anion source compound. Thus, the activator-support can comprise a calcined contact product of at least one solid oxide with at least one electron-withdrawing anion source compound. Typically, the activator-support comprises at least one acidic solid oxide compound. The "activator-support" of the present invention can be a chemically-treated solid oxide. The term "activator-support" is used to imply that these components are not inert, and such components should not be construed as an inert component of the catalyst composition. The term "activator," as used herein, refers generally to a substance that is capable of converting a metallocene component into a catalyst that can polymerize olefins, or converting a contact product of a metallocene component and a component that provides an activatable ligand (e.g., an alkyl, a hydride) to the metallocene, when the metallocene compound does not already comprise such a ligand, into a catalyst that can polymerize olefins. This term is used regardless of the actual activating mechanism. Illustrative activators include activator-supports, aluminoxanes, organoboron or organoborate compounds, ionizing ionic compounds, and the like. Aluminoxanes, organoboron or organoborate compounds, and ionizing ionic compounds generally are referred to as activators if used in a catalyst composition in which an activator-support is not present. If the catalyst composition contains an activator-support, then the aluminoxane, organoboron or organoborate, and ionizing ionic materials are typically referred to as co-catalysts.

The term "metallocene" as used herein describes compounds comprising at least one $\eta^3$ to $\eta^5$-cycloalkadienyl-type moiety, wherein $\eta^3$ to $\eta^5$-cycloalkadienyl moieties include cyclopentadienyl ligands, indenyl ligands, fluorenyl ligands, and the like, including partially saturated or substituted derivatives or analogs of any of these. Possible substituents on these ligands can include H, therefore this invention comprises ligands such as tetrahydroindenyl, tetrahydrofluorenyl, octahydrofluorenyl, partially saturated indenyl, partially saturated fluorenyl, substituted partially saturated indenyl, substituted partially saturated fluorenyl, and the like. In some contexts, the metallocene is referred to simply as the "catalyst," in much the same way the term "co-catalyst" is used herein to refer to, for example, an organoaluminum compound.

The terms "catalyst composition," "catalyst mixture," "catalyst system," and the like, do not depend upon the actual product or composition resulting from the contact or reaction of the initial components of the disclosed or claimed catalyst composition/mixture/system, the nature of the active catalytic site, or the fate of the co-catalyst, the metallocene compound(s), or the activator, after combining these components. Therefore, the terms "catalyst composition," "catalyst mixture," "catalyst system," and the like, encompass the initial starting components of the composition, as well as whatever product(s) may result from contacting these initial starting components, and this is inclusive of both heterogeneous and homogenous catalyst systems or compositions. The terms "catalyst composition," "catalyst mixture," "catalyst system," and the like, can be used interchangeably throughout this disclosure.

The term "contact product" is used herein to describe compositions wherein the components are contacted together in any order, in any manner, and for any length of time, unless otherwise specified. For example, the components can be contacted by blending or mixing. Further, contacting of any component can occur in the presence or absence of any other component of the compositions described herein. Combining additional materials or components can be done by any suitable method. Further, the term "contact product" includes mixtures, blends, solutions, slurries, reaction products, and the like, or combinations thereof. Although "contact product" can include reaction products, it is not required for the respective components to react with one another. Similarly, the term "contacting" is used herein to refer to materials which can be blended, mixed, slurried, dissolved, reacted, treated, or otherwise combined in some other manner.

Although any methods, devices, and materials similar or equivalent to those described herein can be used in the practice or testing of the invention, the typical methods, devices, and materials are herein described.

All publications and patents mentioned herein are incorporated herein by reference for the purpose of describing and disclosing, for example, the constructs and methodologies that are described in the publications, which might be used in connection with the presently described invention.

Several types of ranges are disclosed in the present invention. When a range of any type is disclosed or claimed, the intent is to disclose or claim individually each possible number that such a range could reasonably encompass, including end points of the range as well as any sub-ranges and combinations of sub-ranges encompassed therein. For example, when a chemical moiety having a certain number of carbon atoms is disclosed or claimed, the intent is to disclose or claim individually every possible number that such a range could encompass, consistent with the disclosure herein. For example, the disclosure that a moiety is a $C_1$ to $C_{18}$ hydrocarbyl group, or in alternative language, a hydrocarbyl group having from 1 to 18 carbon atoms, as used herein, refers to a moiety that can have 1, 2, 3, 4, 5, 6, 7, 8, 9, 10, 11, 12, 13, 14, 15, 16, 17, or 18 carbon atoms, as well as any range between these two numbers (for example, a $C_1$ to $C_8$ hydrocarbyl group), and also including any combination of ranges between these two numbers (for example, a $C_2$ to $C_4$ and a $C_{12}$ to $C_{16}$ hydrocarbyl group).

Similarly, another representative example follows for the ratio of Mw/Mn of an ethylene polymer consistent with aspects of this invention. By a disclosure that the ratio of Mw/Mn can be in a range from 6 to 25, the intent is to recite that the ratio of Mw/Mn can be any ratio in the range and, for example, can include any range or combination of ranges from 6 to 25, such as from 7 to 20, from 7 to 18, or from 8 to 15, and so forth. Likewise, all other ranges disclosed herein should be interpreted in a manner similar to these examples.

In general, an amount, size, formulation, parameter, range, or other quantity or characteristic is "about" or "approximate" whether or not expressly stated to be such. Whether or not modified by the term "about" or "approximately," the claims include equivalents to the quantities or characteristics.

DETAILED DESCRIPTION OF THE INVENTION

The present invention is directed generally to dual metallocene catalyst systems, methods for using the catalyst systems to polymerize olefins, the polymer resins produced using such catalyst systems, and articles of manufacture produced using these polymer resins. In particular, the present invention generally relates to bimodal ethylene copolymers having a low molecular weight fraction with a low concentration of comonomer SCBs and a high molecular weight fraction with a relatively higher concentration of comonomer SCBs.

The disclosed bimodal ethylene polymers have a surprisingly high short chain branching ratio between the high molecular weight and low molecular weight components. Beneficially, the low level of comonomer SCB content in the low molecular weight fraction of the of the polymer in combination with unexpectedly high levels of SCB content in the high molecular weight fraction of the polymer can result in improved polymer properties, such as stress crack resistance (ESCR), PENT slow crack growth resistance (ASTM F1473), and natural draw ratio (NDR), and particularly at an equivalent overall polymer density.

Ethylene Polymers

Generally, the polymers disclosed herein are ethylene-based polymers, or ethylene polymers, encompassing homopolymers of ethylene as well as copolymers, terpolymers, etc., of ethylene and at least one olefin comonomer. Comonomers that can be copolymerized with ethylene often can have from 3 to 20 carbon atoms in their molecular chain. For example, typical comonomers can include, but are not limited to, propylene, 1-butene, 1-pentene, 1-hexene, 1-heptene, 1-octene, and the like, or combinations thereof. In an aspect, the olefin comonomer can comprise a $C_3$-$C_{18}$ olefin; alternatively, the olefin comonomer can comprise a $C_3$-$C_{10}$ olefin; alternatively, the olefin comonomer can comprise a $C_4$-$C_{10}$ olefin; alternatively, the olefin comonomer can comprise a $C_3$-$C_{10}$ α-olefin; alternatively, the olefin comonomer can comprise a $C_4$-$C_{10}$ α-olefin; alternatively, the olefin comonomer can comprise 1-butene, 1-hexene, 1-octene, or any combination thereof or alternatively, the comonomer can comprise 1-hexene.

In one aspect, the ethylene polymer of this invention can comprise an ethylene/α-olefin copolymer. For example, the ethylene polymer can comprise an ethylene/1-butene copolymer, an ethylene/1-hexene copolymer, an ethylene/1-octene copolymer, or any combination thereof; alternatively, an ethylene/1-butene copolymer; alternatively, an ethylene/1-hexene copolymer; or alternatively, an ethylene/1-octene copolymer.

If the resultant polymer produced in accordance with the present invention is, for example, an ethylene copolymer, its properties can be characterized by various analytical techniques known and used in the polyolefin industry. Articles of manufacture can be formed from, and/or can comprise, the ethylene polymers (e.g., ethylene copolymers) of this invention, whose typical properties are provided below.

An illustrative and non-limiting example of an ethylene polymer (e.g., an ethylene/1-hexene copolymer) described herein can have a density in a range from 0.92 to 0.955 g/cm$^3$, a HLMI of less than or equal to 35 g/10 min, and a ratio of a number of short chain branches (SCBs) per 1000 total carbon atoms at Mz to a number of SCBs per 1000 total carbon atoms at Mn in a range from 11.5 to 22. Another illustrative and non-limiting example of an ethylene polymer (e.g., an ethylene/1-hexene copolymer) described herein can have a density in a range from 0.92 to 0.955 g/cm$^3$, a HLMI of less than or equal to 35 g/10 min, and a higher molecular weight (HMW) and a lower molecular weight (LMW) component. The ratio of the number of SCBs per 1000 total carbon atoms at Mn of the HMW component to the number of SCBs per 1000 total carbon atoms at Mn of the LMW component can be in a range from 10.5 to 22. These illustrative and non-limiting examples of ethylene polymers consistent with the present invention also can have any of the polymer properties listed below and in any combination, unless indicated otherwise.

The density of the ethylene-based polymer can range from 0.92 to 0.955 g/cm$^3$. In one aspect, the density can range from 0.92 to 0.95, from 0.92 to 0.94 in another aspect, from 0.925 to 0.955 in another aspect, from 0.925 to 0.95 in yet another aspect, or from 0.925 to 0.943 g/cm$^3$ in still another aspect.

The ethylene polymer has a very low melt index, as indicated by the high load melt index (HLMI) of less than or equal to 35 g/10 min. In some aspects, the HLMI of the ethylene polymer can be less than or equal to 30 g/10 min, or less than or equal to 25 g/10 min. In other aspects, the HLMI of the ethylene polymer can be less than or equal to 20 g/10 min, or less than or equal to 15 g/10 min.

The ethylene polymer can comprise a high or higher molecular weight (HMW) component (or a first component) and a low or lower molecular weight (LMW) component (or a second component). These component terms are relative, are used in reference to each other, and are not limited to the actual molecular weights of the respective components. The molecular weight characteristics of these LMW and HMW components are determined by deconvoluting the composite (overall polymer) molecular weight distribution (e.g., determined using gel permeation chromatography).

The amount of the lower molecular weight (LMW) component, based on the total polymer, is not limited to any particular range. Generally, however, the amount of the lower molecular weight component can be in a range from 40 to 90 wt. %, from 40 to 85 wt. %, from 45 to 90 wt. %, from 45 to 85 wt. %, or from 50 to 85 wt. %. The higher molecular weight component can have a Mn in a range from 400,000 to 800,000 g/mol. For instance, the Mn can fall within a range from 450,000 to 750,000 g/mol, or alternatively, from 500,000 to 700,000 g/mol. Additionally or alternatively, the higher molecular weight component can have a Mp in a range from 400,000 to 1,100,000 g/mol, such as from 500,000 to 1,100,000 g/mol, or from 550,000 to 1,000,000 g/mol. The lower molecular weight component of the ethylene polymer can have a Mz in a range from 70,000 to 200,000 g/mol (or from 70,000 to 170,000, or from 75,000 to 150,000, or from 80,000 to 130,000 g/mol).

Generally, the unexpectedly high ratio of the number of SCBs per 1000 total carbon atoms at Mn of the HMW component to the number of SCBs per 1000 total carbon atoms at Mn of the LMW component falls within a range from 10.5 to 22. Other suitable ranges for this ratio include, but are not limited to, from 11 to 22, from 11 to 21, from 12 to 22, from 12 to 20, or from 13 to 19, and the like. Additionally or alternatively, the ratio of the number of SCBs per 1000 total carbon atoms at Mp of the HMW component to the number of SCBs per 1000 total carbon atoms at Mp of the LMW component can range from 11 to 18, and in some aspects, from 11 to 14, from 11.5 to 16, or from 11.5 to 15. Additionally or alternatively, the ratio of the number of SCBs per 1000 total carbon atoms at Mp of the HMW component to the number of SCBs per 1000 total carbon atoms at Mz of the LMW component can range from 7.5 to 18, and in some aspects, from 8 to 16, from 9 to 14, or from 10 to 12.

In an aspect, the ethylene polymer (inclusive of the higher and lower molecular weight components) can have a Mw in a range from 200,000 to 800,000, from 225,000 to 725,000, from 250,000 to 600,000, or from 275,000 to 575,000 g/mol. Additionally or alternatively, the ethylene polymer can have a Mp in a range from 30,000 to 90,000 g/mol, such as from 35,000 to 85,000, from 40,000 to 80,000, or from 45,000 to 75,000 g/mol. Additionally or alternatively, the ethylene polymer can have a Mn in a range from 15,000 to 60,000 g/mol, such as from 18,000 to 57,000, from 22,000 to 53,000, or from 25,000 to 50,000 g/mol. Additionally or alternatively, the ethylene polymer can have a Mz in a range from 1,300,000 to 3,100,000 g/mol, such as from 1,400,000 to 3,000,000, from 1,500,000 to 2,500,000, or from 1,700,000 to 2,200,000 g/mol. The ethylene polymer has a relatively broad molecular weight distribution, often with a ratio of Mw/Mn in a range from 6 to 25. For instance, the ratio of Mw/Mn of the polymer can be from 7 to 20; alternatively, from 7 to 18; alternatively, from 8 to 15; or alternatively, from 9 to 13.

In accordance with a particular aspect of this invention, the ethylene polymer can have a bimodal molecular weight distribution. Generally, there are two distinguishable peaks in the molecular weight distribution curve (as determined using gel permeation chromatography (GPC)), there is a valley between the peaks, and the peaks can be separated or deconvoluted. In another aspect, the ethylene polymer can have a multimodal (e.g., trimodal) molecular weight distribution. For instance, the ethylene polymer can have a LMW component, a MMW (medium molecular weight) component, and a HMW component. The LMW component can be a homopolymer or a copolymer with very low comonomer content. The MMW and HMW components can be copolymers, with the HMW component having more comonomer (and SCBs) than the MMW component.

Often, the unexpectedly high ratio of the number of SCBs per 1000 total carbon atoms at Mz to the number of SCBs per 1000 total carbon atoms at Mn falls within a range from 11.5 to 22. Other suitable ranges for this ratio include, but are not limited to, from 12 to 21, from 12 to 18, from 13 to 22, or from 13 to 19, and the like. While not limited thereto, and depending upon the polymer density, the number of SCBs per 1000 total carbon atoms of the ethylene polymer at Mz can range from 10 to 30, and in some aspects, from 12 to 30, from 15 to 28, or from 17 to 26.

FIG. 1 is a graphical depiction of D85 and D15 for a molecular weight distribution curve as a function of increasing logarithm of the molecular weight. D85 is the molecular weight at which 85% of the polymer by weight has higher molecular weight, and D15 is the molecular weight at which 15% of the polymer by weight has higher molecular weight. In accordance with one aspect of the present invention, the ethylene polymers disclosed herein can have a molecular weight at D85 in a range from 14,000 to 50,000 g/mol, and in another aspect, from 15,000 to 40,000, from 16,000 to 38,000, or from 17,000 to 35,000 g/mol.

Figure 2:
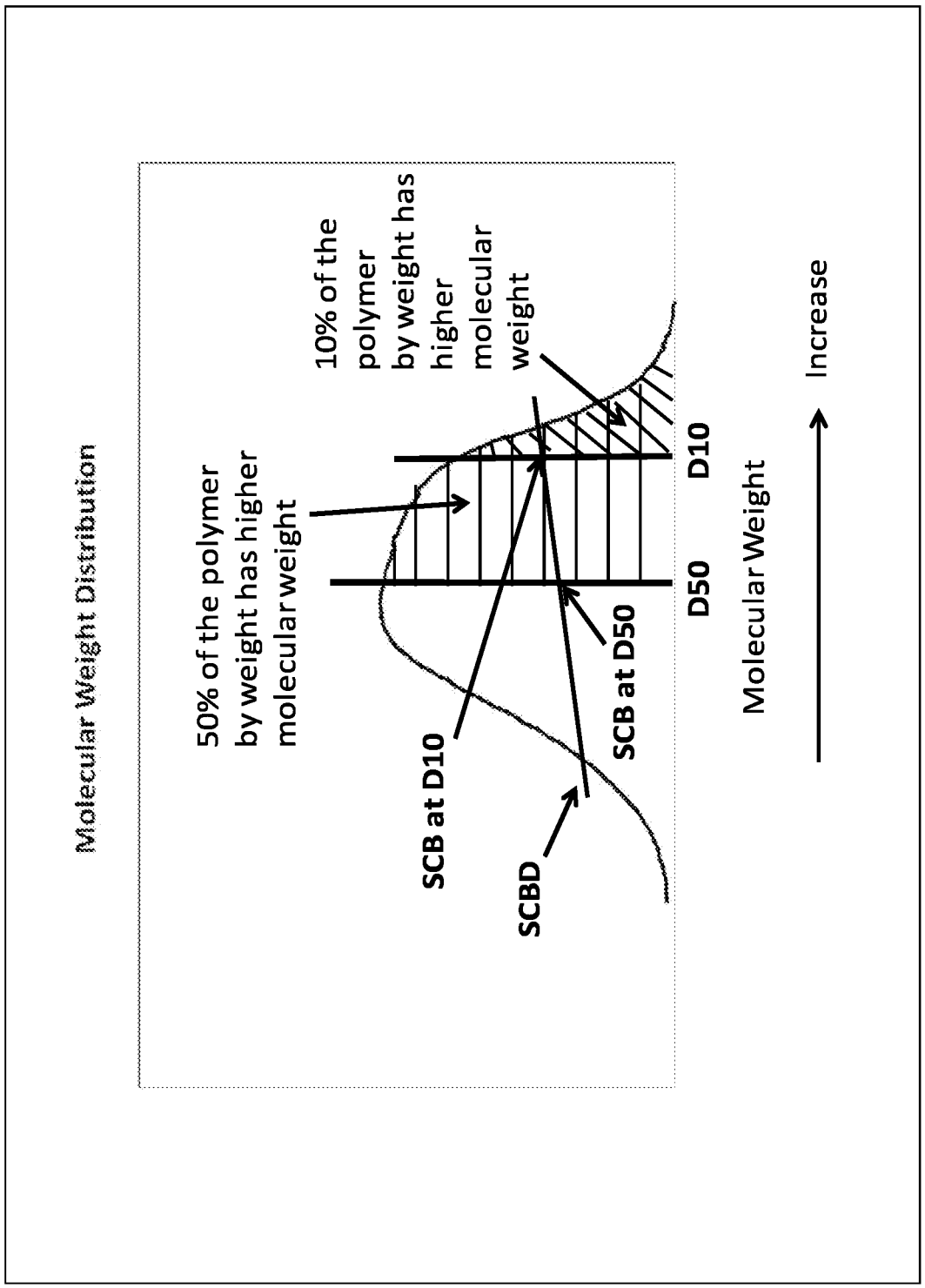
FIG. 2 illustrates the definitions of D50 and D10 on a molecular weight distribution curve and the short chain branch content at D50 and D10.

Similar to FIG. 1, FIG. 2 is a graphical depiction of D50 and D10 for a molecular weight distribution curve as a function of increasing logarithm of the molecular weight. D50 is the molecular weight at which 50% of the polymer by weight has higher molecular weight, and D10 is the molecular weight at which 10% of the polymer by weight has higher molecular weight. In one aspect, the ethylene polymers disclosed herein can have a molecular weight at D10 in a range from 750,000 to 2,000,000 g/mol, and from 800,000 to 1,750,000 g/mol in another aspect, and from 850,000 to 2,000,000 g/mol in yet another aspect, and from 900,000 to 1,750,000 g/mol in still another aspect. While not limited thereto, and depending upon the polymer density, the number of SCBs per 1000 total carbon atoms of the ethylene polymer at D10 can range from 9 to 30; alternatively, from 12 to 28; alternatively, from 14 to 27; or alternatively, from 16 to 25.

In an aspect, the ethylene polymer described herein can be a reactor product (e.g., a single reactor product), for example, not a post-reactor blend of two polymers, for instance, having different molecular weight characteristics. As one of skill in the art would readily recognize, physical blends of two different polymer resins can be made, but this necessitates additional processing and complexity not required for a reactor product.

Moreover, the ethylene polymer can be produced with dual metallocene catalyst systems containing zirconium and/or hafnium, as discussed herein. Ziegler-Natta and chromium based catalysts systems can be used, but are not required. Therefore, the ethylene polymer can contain no measurable amount of chromium or titanium or vanadium or magnesium (catalyst residue), i.e., less than 0.1 ppm by weight. In some aspects, the ethylene polymer can contain, independently, less than 0.08 ppm, less than 0.05 ppm, or less than 0.03 ppm, of chromium (or titanium, or vanadium, or magnesium).

Articles and Products

Articles of manufacture can be formed from, and/or can comprise, the ethylene polymers (e.g., ethylene/1-hexene copolymers) of this invention and, accordingly, are encompassed herein. For example, articles which can comprise the polymers of this invention can include, but are not limited to, an agricultural film, an automobile part, a bottle, a container for chemicals, a drum, a fiber or fabric, a food packaging film or container, a food service article, a fuel tank, a geomembrane, a household container, a liner, a molded product, a medical device or material, an outdoor storage product (e.g., panels for walls of an outdoor shed), outdoor play equipment (e.g., kayaks, bases for basketball goals), a pipe, a sheet or tape, a toy, or a traffic barrier, and the like. Various processes can be employed to form these articles. Non-limiting examples of these processes include injection molding, blow molding, rotational molding, film extrusion, sheet extrusion, profile extrusion, thermoforming, and the like. Additionally, additives and modifiers often are added to these polymers in order to provide beneficial polymer processing or end-use product attributes. Such processes and materials are described in *Modern Plastics Encyclopedia*, Mid-November 1995 Issue, Vol. 72, No. 12; and *Film Extrusion Manual—Process, Materials, Properties*, TAPPI Press, 1992; the disclosures of which are incorporated herein by reference in their entirety.

Catalyst Systems and Polymerization Processes

In accordance with aspects of the present invention, the ethylene polymer (e.g., the ethylene copolymer) can be produced using a dual catalyst system. In these aspects, catalyst component I can comprise any suitable unbridged metallocene compound disclosed herein, and catalyst component II can comprise any suitable bridged metallocene compound disclosed herein. The catalyst system also can comprise any suitable activator or any activator disclosed herein, and optionally, any suitable co-catalyst or any co-catalyst disclosed herein.

Referring first to catalyst component I, which can comprise an unbridged metallocene compound. In one aspect, catalyst component I can comprise an unbridged metallocene compound containing two indenyl groups or an indenyl group and a cyclopentadienyl group, wherein at least one indenyl group has at least one halogen-substituted hydrocarbyl substituent with at least two halogen atoms. In another aspect, catalyst component I can comprise an unbridged metallocene compound containing two indenyl groups, wherein at least one indenyl group has at least one halogen-substituted hydrocarbyl substituent with at least two halogen atoms. In yet another aspect, catalyst component I can comprise an unbridged metallocene compound containing an indenyl group and a cyclopentadienyl group, wherein the indenyl group has at least one halogen-substituted hydrocarbyl substituent with at least two halogen atoms. While not limited thereto, the halogen-substituted hydrocarbyl substituent can comprise an aryl group. The halogen atoms, independently, can be any halogen, but often each halogen is fluorine. The unbridged metallocene compound can contain titanium, zirconium, or hafnium, but catalyst component I often is a zirconium-based metallocene compound.

Catalyst component I can comprise, in particular aspects of this invention, an unbridged metallocene compound having the formula: $(X^1)(X^2)(X^3)(X^4)M^1$ wherein $M^1$, $X^1$, $X^2$, $X^3$ and $X^4$ are selected as follows: a) $M^1$ can be titanium, zirconium, or hafnium; b) $X^1$ can be a substituted indenyl ligand wherein at least one substituent is a halogen-substituted $C_1$-$C_{20}$ hydrocarbyl group comprising at least two halogen atoms; c) $X^2$ can be [1] a substituted or unsubstituted cyclopentadienyl ligand which is absent a halogen-substituted hydrocarbyl group, or [2] a substituted or unsubstituted indenyl ligand; wherein $X^1$ and $X^2$ are unbridged, and wherein any substituent on $X^1$ and $X^2$ which is not a halogen-substituted $C_1$-$C_{20}$ hydrocarbyl group is selected independently from a $C_1$-$C_{20}$ hydrocarbyl group; and d) $X^3$ and $X^4$ are independently selected from a halide, hydride, a $C_1$-$C_{20}$ hydrocarbyl group, a $C_1$-$C_{20}$ heterohydrocarbyl group, tetrahydroborate, or $OBR^A_2$ or $OSO_2R^A$ wherein $R^A$ is independently a $C_1$-$C_{12}$ hydrocarbyl group.

Unexpectedly, when a metallocene indenyl ligand $X^1$ contains at least one substituent which is a halogen-substituted $C_1$-$C_{20}$ hydrocarbyl group, such as a $C_1$-$C_{20}$ hydrocarbyl group substituted with at least two fluorine, chlorine, or bromine substituents independently selected, the catalyst composition comprising catalyst component I can produce low molecular weight polyethylene with unexpectedly low levels of short chain branching, even in the presence of significant concentrations of an α-olefin co-monomer. Polymers having these properties can occur when [1] the metallocene comprises one indenyl ligand $X^1$ which contains a halogen-disubstituted $C_1$-$C_{20}$ hydrocarbyl group as a substituent, and [2] when the ligand $X^2$ is a cyclopentadienyl ligand, $X^2$ is absent a halogen-substituted hydrocarbyl group. The presence of a halogen-substituted hydrocarbyl group on $X^2$ when $X^2$ is an indenyl ligand still provides the desirable low levels of short chain branching, but not when $X^2$ is a cyclopentadienyl ligand.

In an aspect, the substituted indenyl ligand $X^1$ containing a halogenated substituent is absent a halogen substituent which is bonded directly to the indenyl ligand. In another aspect, the $X^2$ ligand, or both $X^1$ and $X^2$ are absent a halogen substituent which is bonded directly to the indenyl ligand.

In an aspect, the $M^1$ in the unbridged metallocene can be Ti; alternatively, $M^1$ can be Zr; alternatively, $M^1$ can be Hf; alternatively, $M^1$ can be Ti or Zr; alternatively, $M^1$ can be Ti or Hf; alternatively, $M^1$ can be Zr or Hf; or alternatively, $M^1$ can be Ti, Zr, or Hf.

According to a further aspect, the groups $X^3$ and $X^4$ of the unbridged metallocene can be independently selected from F, Cl, Br, a $C_1$-$C_{12}$ hydrocarbyloxide group, a $C_1$-$C_{12}$ hydrocarbylamino group, or a trihydrocarbylsilyl group wherein each hydrocarbyl is independently a $C_1$-$C_{12}$ hydrocarbyl group.

The halogen-substituted hydrocarbyl substituent of $X^1$ of the unbridged metallocene can be selected from a $C_1$-$C_{20}$ hydrocarbyl group substituted with at least two fluoro-, chloro-, bromo-, or iodo-substituents, or a combination thereof independently selected. In some aspects, the halogen-substituted hydrocarbyl substituent of $X^1$ is selected from a $C_1$-$C_{20}$ hydrocarbyl group or a $C_1$-$C_{12}$ hydrocarbyl group substituted with at least two fluoro-, chloro-, or bromo-substituents. In an aspect, the $X^1$ can be a substituted indenyl ligand wherein at least one substituent is a halogen-substituted $C_1$-$C_{20}$ hydrocarbyl group comprising 2, 3, 4, 5, 6, 7, 8, or more halogen atoms such as fluorine atoms, including ranges between any of these numbers, as allowed by the size and structure of a particular hydrocarbyl group. For example, when the halogen-substituted $C_1$-$C_{20}$ hydrocarbyl group is a phenyl group, the upper limit of halogen substituents is five (5) substituents, and the phenyl group can include 2, 3, 4, or 5 substituents. In an aspect, the halogen-substituted $C_1$-$C_{20}$ hydrocarbyl group can comprise from 2 to 8, from 2 to 7, from 2 to 6, from 2 to 5, from 2 to 4, or from 2 to 3 halogen atoms.

For example, in one aspect, the halogen-substituted hydrocarbyl substituent of $X^1$ of the unbridged metallocene can be selected from $C_1$-$C_{20}$ aliphatic or $C_6$-$C_{20}$ aromatic group substituted with at least two fluoro-, chloro-, or bromo-substituents, or a combination thereof. In another aspect, the halogen-substituted hydrocarbyl substituent of $X^1$ of the unbridged metallocene can be selected from a fluoro-disubstituted, chloro-disubstituted, or bromo-disubstituted $C_1$-$C_{12}$ alkyl, $C_2$-$C_{12}$ alkenyl, $C_3$-$C_7$ cycloalkyl, $C_3$-$C_7$ cycloalkenyl, $C_6$-$C_{10}$ aryl, or $C_7$-$C_{12}$ aralkyl. In still a further aspect, the halogen-substituted hydrocarbyl substituent of $X^1$ of the metallocene can be further substituted with at least one additional substituent selected from a $C_1$-$C_{12}$ hydrocarbyl group. In some aspects, the $X^1$ ligand of the unbridged metallocene can be an indenyl ligand which can be substituted with a halogen-substituted hydrocarbyl group selected from: [1] —$C_6X^9_nH_{5-n}$ or —$CH_2C_6X^9_nH_{5-n}$, wherein n is an integer from 2 to 5; [2] —$(CH_2)_mCX^9_pH_{3-p}$, wherein m is an integer from 0 to 3 and wherein p is an integer from 2 to 3; or [3] —$C(CX^9_3)_q(CH_3)_{3-q}$ or —$C(CX^9_3)_qH_{3-q}$, wherein q is an integer from 2 to 3; and wherein $X^9$, in each occurrence, is selected independently from fluoro, chloro, or bromo.

As disclosed herein, in an aspect, the $X^2$ ligand of the unbridged metallocene can be [1] a substituted or unsubstituted cyclopentadienyl ligand which is absent a halogen-substituted hydrocarbyl group, or [2] a substituted or unsubstituted indenyl ligand; wherein $X^1$ and $X^2$ are unbridged, and wherein any substituent on $X^1$ and $X^2$ which is not a halogen-substituted $C_1$-$C_{20}$ hydrocarbyl group is selected independently from a $C_1$-$C_{20}$ hydrocarbyl group. For example, in one aspect, $X^2$ can be an indenyl ligand which is unsubstituted; alternatively, substituted with at least one $C_1$-$C_{20}$ hydrocarbyl group; alternatively, substituted with at least one halogen-substituted $C_1$-$C_{20}$ hydrocarbyl group; alternatively, substituted with at least one $C_1$-$C_{12}$ hydrocarbyl group; or alternatively, substituted with at least one halogen-substituted $C_1$-$C_{12}$ hydrocarbyl group.

In another aspect, the $X^2$ ligand of the unbridged metallocene can be an indenyl ligand which is unsubstituted, substituted with at least one unsubstituted $C_1$-$C_{20}$ aliphatic or $C_6$-$C_{20}$ aromatic group, or substituted with at least one $C_1$-$C_{20}$ aliphatic or $C_6$-$C_{20}$ aromatic group substituted with at least one fluoro-, chloro-, or bromo-substituent, or a combination thereof. Further, $X^2$ can be an indenyl ligand which is substituted with at least one halogen-substituted hydrocarbyl substituent selected from $C_1$-$C_{12}$ aliphatic or $C_6$-$C_{10}$ aromatic group substituted with at least one fluoro-, chloro-, or bromo-substituent, or a combination thereof.

For example, in some aspects, the $X^2$ ligand of the unbridged metallocene can be an indenyl ligand which is substituted with at least one halogen-substituted hydrocarbyl substituent selected from a fluoro-substituted, chloro-substituted, or bromo-substituted $C_1$-$C_{12}$ alkyl, $C_2$-$C_{12}$ alkenyl, $C_3$-$C_7$ cycloalkyl, $C_3$-$C_7$ cycloalkenyl, $C_6$-$C_{10}$ aryl, or $C_7$-$C_{12}$ aralkyl.

In further aspects, the $X^2$ ligand of the unbridged metallocene can be a cyclopentadienyl ligand which is unsubstituted. In another aspect, the $X^2$ ligand of the metallocene can be a cyclopentadienyl ligand which is substituted with at least one $C_1$-$C_{20}$ hydrocarbyl group; or alternatively, substituted with at least one $C_1$-$C_{12}$ hydrocarbyl group. The $X^2$ ligand of the metallocene can be a cyclopentadienyl ligand which is substituted with at least one $C_1$-$C_{20}$ aliphatic group; alternatively, substituted with at least one $C_6$-$C_{20}$ aromatic group; alternatively, substituted at least one $C_1$-$C_{12}$ aliphatic group; or alternatively, substituted with at least one $C_6$-$C_{10}$ aromatic group. For example, in an aspect, the $X^2$ ligand of the unbridged metallocene can be a cyclopentadienyl ligand which is substituted with at least one hydrocarbyl substituent selected independently from a $C_1$-$C_{12}$ alkyl, $C_2$-$C_{12}$ alkenyl, $C_3$-$C_7$ cycloalkyl, $C_3$-$C_7$ cycloalkenyl, $C_6$-$C_{10}$ aryl, or $C_7$-$C_{12}$ aralkyl.

As disclosed herein, the $X^1$ ligand of the unbridged metallocene can be a substituted indenyl ligand wherein at least one substituent is a halogen-substituted $C_1$-$C_{20}$ hydrocarbyl group comprising at least two halogen atoms, for example, a fluoride-disubstituted indenyl ligand. In an aspect, the halogen-substituted $C_1$-$C_{20}$ hydrocarbyl group comprises at least two halogen atoms and up to 8 or more halogen atoms, depending upon the size and structure of the $C_1$-$C_{20}$ hydrocarbyl group. Further, the $X^2$ ligand of the unbridged metallocene can be a substituted or an unsubstituted indenyl ligand, for example, $X^2$ can be an indenyl ligand which is substituted with at least one $C_1$-$C_{20}$ aliphatic or $C_6$-$C_{20}$ aromatic group substituted with at least one fluoro-, chloro-, or bromo-substituent, or a combination thereof. For example, X¹ can be an indenyl ligand which is substituted with a group selected independently from

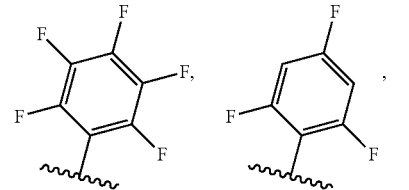

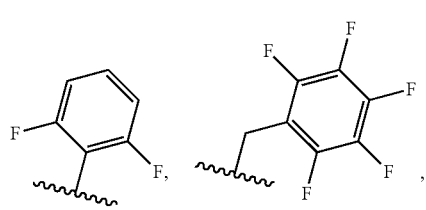

and/or X² can be an indenyl ligand which is substituted with a group selected independently from

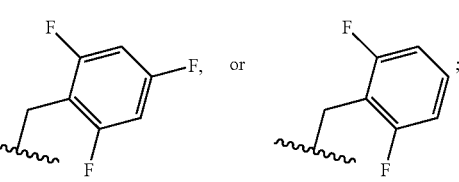

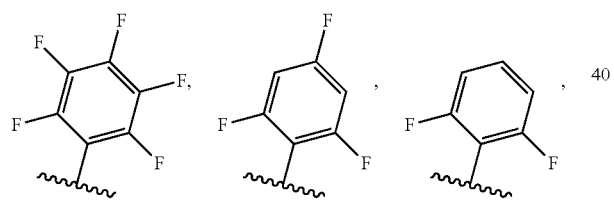

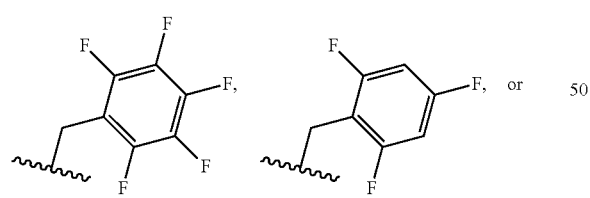

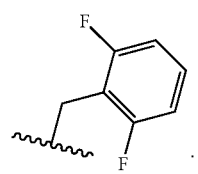

Examples of suitable metallocene compounds for use as catalyst component I can include, but are not limited to, the following:

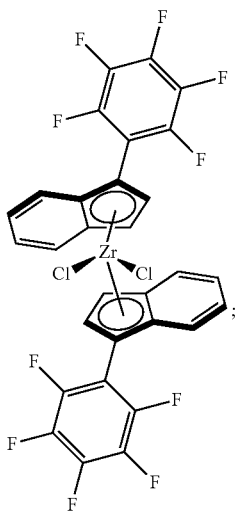

IE-1

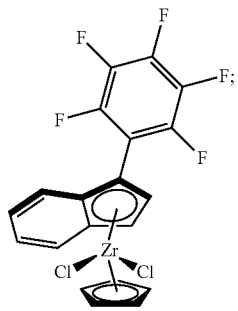

IE-2

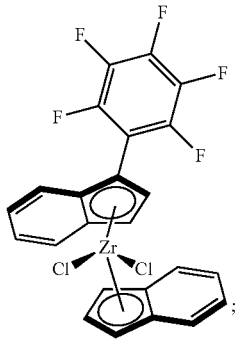

IE-3

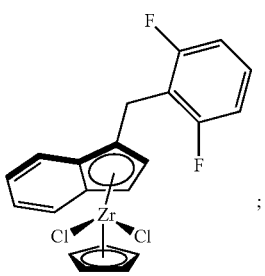

IE-4

-continued

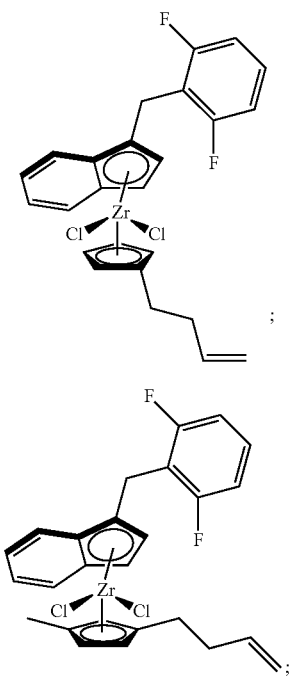

IE-5

IE-6 or any combination thereof. For example, in an aspect, catalyst component I can be:

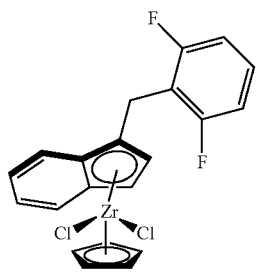

IE-4

In some aspects, $X^3$ and $X^4$ can be independently selected from a halide, F, Cl, Br, a $C_1$-$C_{12}$ hydrocarbyloxide group, a $C_1$-$C_{12}$ hydrocarbylamino group, or a trihydrocarbylsilyl group wherein each hydrocarbyl of these groups is independently selected from a $C_1$-$C_{12}$ hydrocarbyl group. In some aspects, each hydrocarbyl of these groups can be independently selected from a $C_1$-$C_{20}$ hydrocarbyl group.

Referring now to catalyst component II, which can be a bridged metallocene compound. In one aspect, for instance, catalyst component II can comprise a bridged zirconium or hafnium based metallocene compound. In another aspect, catalyst component II can comprise a bridged zirconium or hafnium based metallocene compound with an alkenyl substituent. In yet another aspect, catalyst component II can comprise a bridged zirconium or hafnium based metallocene compound with an alkenyl substituent and a fluorenyl group. In still another aspect, catalyst component II can comprise a bridged zirconium or hafnium based metallocene compound with a cyclopentadienyl group and a fluorenyl group, and with an alkenyl substituent on the bridging group and/or on the cyclopentadienyl group. Further, catalyst component II can comprise a bridged metallocene compound having an aryl group substituent on the bridging group.

Catalyst component II can comprise, in particular aspects of this invention, a bridged metallocene compound having the formula $(X^5)(X^6)(X^7)(X^8)M^2$, wherein $M^2$, $X^5$, $X^6$, $X^7$ and $X^8$ are selected as follows: a) $M^2$ can be titanium, zirconium, or hafnium; b) $X^5$ can be a substituted cyclopentadienyl, indenyl, or fluorenyl ligand, wherein any non-bridging substituent, when present, is selected independently from a $C_1$-$C_{12}$ hydrocarbyl group; c) $X^6$ can be a substituted fluorenyl ligand, wherein any non-bridging substituent, when present, is selected independently from a $C_1$-$C_{12}$ hydrocarbyl group or a $C_1$-$C_{12}$ heterohydrocarbyl group; wherein $X^5$ and $X^6$ can each be substituted by a bridging group selected from $(>ER^B_2)_x$ or $>BR^B$, wherein x is an integer from 1 to 3, E in each occurrence is selected independently from a carbon atom or a silicon atom, $R^B$ in each occurrence is selected independently from H or a $C_1$-$C_{12}$ hydrocarbyl group, and wherein optionally, two $R^B$ moieties independently form a $C_3$-$C_6$ cyclic group; and d) $X^7$ and $X^8$ can be independently selected from a halide, hydride, a $C_1$-$C_{20}$ hydrocarbyl group, a $C_1$-$C_{20}$ heterohydrocarbyl group, tetrahydroborate, or $OBR^A_2$ or $OSO_2R^A$ wherein $R^A$ is independently a $C_1$-$C_{12}$ hydrocarbyl group.

In the bridging groups $(>ER^B_2)_x$ or $>BR^B$, x is an integer from 1 to 3, in each occurrence in $(>ER^B_2)_x$, E is selected independently from a carbon atom or a silicon atom, $R^B$ in each occurrence is selected independently from H or a $C_1$-$C_{12}$ hydrocarbyl group, and wherein optionally, two $R^B$ moieties independently form a $C_3$-$C_6$ cyclic group. In another aspect, $(>ER^B_2)_x$ can be $(-CR^B_2CR^B_2-)$, $(-SiR^B_2SiR^B_2-)$, $(-CR^B_2SiR^B_2-)$, $(-CR^B_2CR^B_2CR^B_2-)$, $(-SiR^B_2CR^B_2CR^B_2-)$, $(-CR^B_2SiR^B_2CR^B_2-)$, $(-SiR^B_2CR^B_2SiR^B_2-)$, $(-SiR^B_2SiR^B_2CR^B_2-)$, or $(-SiR^B_2SiR^B_2SiR^B_2-)$. Examples of the bridging groups $(>ER^B_2)_x$ or $>BR^B$ include, but are not limited to, $>CMe_2$, $>CPh_2$, $>CHMe$, $>CHPh$, $>CH(tolyl)$, $>CMeEt$, $>CMe(CH_2CH_2CH_3)$, $>CMe(CH_2CH_2CH_2CH_3)$, $>CH(CH_2CH_2CH=CH_2)$, $>CMe(CH_2CH_2CH=CH_2)$, $>CEt(CH_2CH_2CH=CH_2)$, $>CPh(CH_2CH_2CH=CH_2)$, $>SiMe_2$, $>SiPh_2$, $>SiEt_2$, $>Si(tolyl)_2$, $(-CH_2CH_2-)$, $(-CMe_2CMe_2-)$, $(-CH_2CH_2CH_2-)$, $(-CH_2SiMe_2CH_2-)$, $(-CH_2SiPh_2CH_2-)$, $(-SiMe_2SiMe_2-)$, $>BMe$, $>BEt$, $>BPh$, $>B(tolyl)$, and the like (Me is methyl, Et is ethyl, Ph is phenyl).

In an aspect, $X^5$, in addition to comprising the bridging substituent, can be [1] otherwise unsubstituted or [2] substituted with a $C_1$-$C_{12}$ hydrocarbyl group. In aspects, $X^5$ can be a cyclopentadienyl ligand which, in addition to comprising the bridging substituent, is [1] otherwise unsubstituted or [2] substituted with a $C_1$-$C_6$ alkyl or $C_2$-$C_8$ alkenyl group.

In one aspect, $X^6$ can be a fluorenyl ligand substituted with two substituents selected independently from a $C_1$-$C_{12}$ hydrocarbyl group, in addition to the bridging substituent. In an aspect, $X^6$ can be a fluorenyl ligand and wherein $R^B$ is selected independently from a $C_1$-$C_6$ alkyl or $C_2$-$C_8$ alkenyl group.

According to an aspect, the catalyst component II can comprise, consist essentially of, consist of, or is selected from a metallocene compound having the formula:

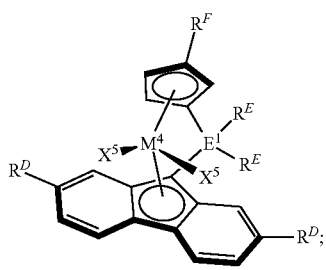

wherein:

M⁴ is zirconium or hafnium;

X⁵ in each occurrence is independently F, Cl, Br, I, H, methyl, benzyl, phenyl, or methoxy;

$R^D$ in each occurrence is selected independently from H, $C_1$-$C_{12}$ alkyl, $C_2$-$C_{12}$ alkenyl, $C_6$-$C_{10}$ aryl, $C_7$-$C_{12}$ aralkyl, or $C_1$-$C_{12}$ hydrocarbyloxide;

E is C or Si;

$R^E$ in each occurrence is selected independently from H, $C_1$-$C_{12}$ alkyl, $C_2$-$C_{12}$ alkenyl, $C_6$-$C_{10}$ aryl, or $C_7$-$C_{12}$ aralkyl; and $R^F$ is selected independently from H, $C_1$-$C_{12}$ alkyl, $C_2$-$C_{12}$ alkenyl, $C_6$-$C_{10}$ aryl, or $C_7$-$C_{12}$ aralkyl.

In some aspects, the catalyst component II can comprise, consist essentially of, consist of, or is selected from a metallocene compound having the formula:

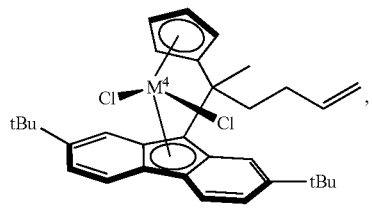

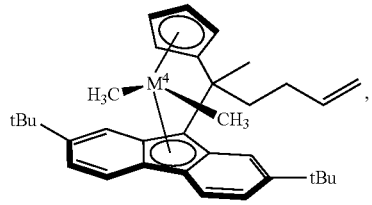

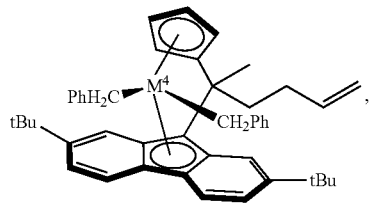

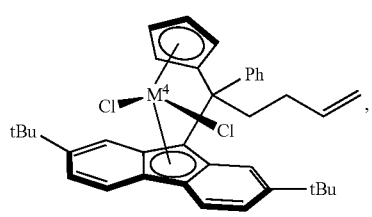

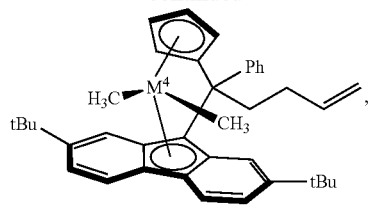

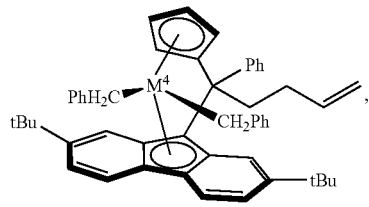

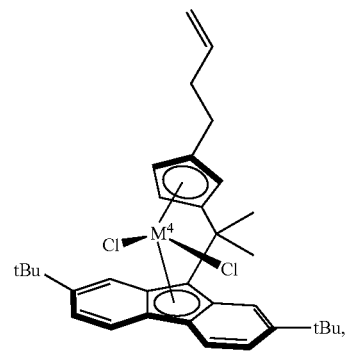

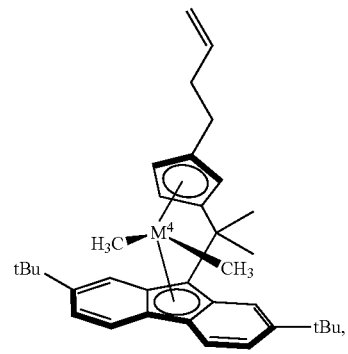

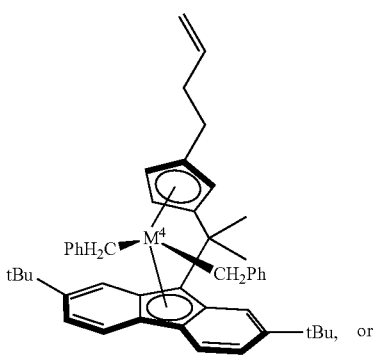

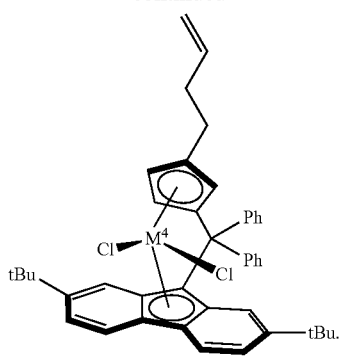
Illustrative and non-limiting examples of bridged metallocene compounds suitable for use as catalyst component II can include the following compounds (Me=methyl, Ph=phenyl; t-Bu=tert-butyl):
(14)
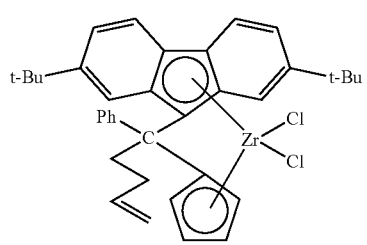
(15)
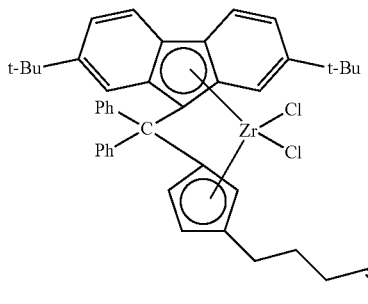
(16)
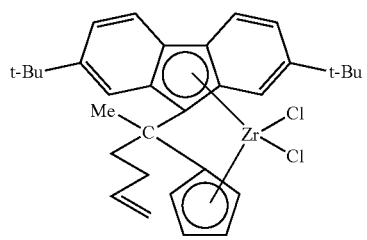
(17)
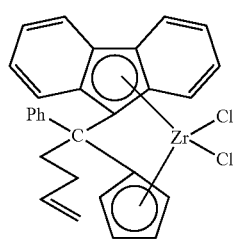
(18)
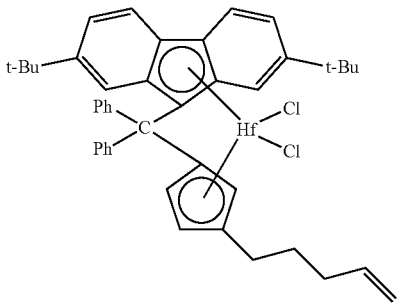
(19)
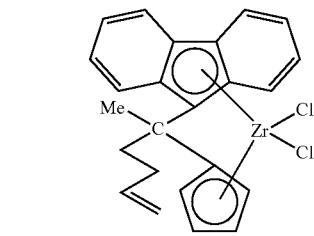
(20)
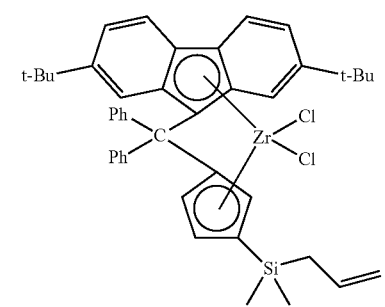
(21)
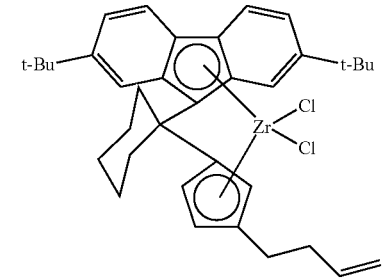
(22)
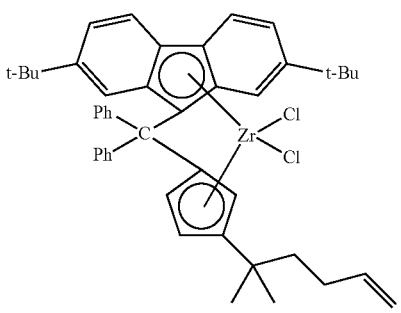

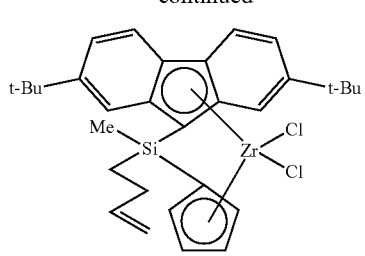

(23)

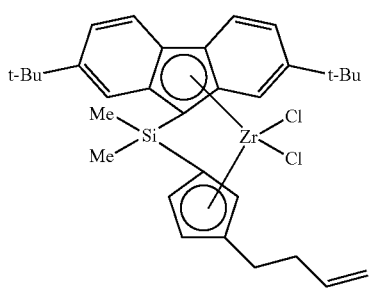

(24)

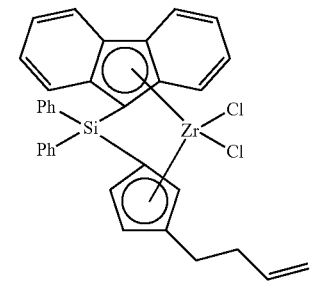

(25)

and the like, as well as combinations thereof.

Catalyst component II is not limited solely to the bridged metallocene compounds such as described above. Other suitable bridged metallocene compounds are disclosed in U.S. Pat. Nos. 7,026,494, 7,041,617, 7,226,886, 7,312,283, 7,517,939, 7,619,047, 7,763,561, 8,268,944, 8,507,621, 8,703,886, and 10,239,975, which are incorporated herein by reference in their entirety.

According to an aspect of this invention, the weight ratio of catalyst component I to catalyst component II in the catalyst composition can be in a range from 10:1 to 1:10, from 8:1 to 1:8, from 5:1 to 1:5, from 4:1 to 1:4, from 3:1 to 1:3; from 2:1 to 1:2, from 1.5:1 to 1:1.5, from 1.25:1 to 1:1.25, or from 1.1:1 to 1:1.1. In another aspect, catalyst component II is the major component of the catalyst composition, and in such aspects, the weight ratio of catalyst component I to catalyst component II in the catalyst composition can be in a range from 1:1 to 1:10, from 1:1 to 1:5, or from 1:1 to 1:3.

Additionally, the dual catalyst system contains an activator. For example, the catalyst system can contain an activator-support, an aluminoxane compound, an organoboron or organoborate compound, an ionizing ionic compound, and the like, or any combination thereof. The catalyst system can contain one or more than one activator.

In one aspect, the catalyst system can comprise an aluminoxane compound, an organoboron or organoborate compound, an ionizing ionic compound, and the like, or a combination thereof. Examples of such activators are disclosed in, for instance, U.S. Pat. Nos. 3,242,099, 4,794,096, 4,808,561, 5,576,259, 5,807,938, 5,919,983, and 8,114,946, the disclosures of which are incorporated herein by reference in their entirety. In another aspect, the catalyst system can comprise an aluminoxane compound. In yet another aspect, the catalyst system can comprise an organoboron or organoborate compound. In still another aspect, the catalyst system can comprise an ionizing ionic compound.

In other aspects, the catalyst system can comprise an activator-support, for example, an activator-support comprising a solid oxide treated with an electron-withdrawing anion. Examples of such materials are disclosed in, for instance, U.S. Pat. Nos. 7,294,599, 7,601,665, 7,884,163, 8,309,485, 8,623,973, and 9,023,959, which are incorporated herein by reference in their entirety. For instance, the activator-support can comprise fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided-chlorided silica-coated alumina, fluorided silica-coated alumina, sulfated silica-coated alumina, or phosphated silica-coated alumina, and the like, as well as any combination thereof. In some aspects, the activator-support can comprise a fluorided solid oxide and/or a sulfated solid oxide.

Various processes can be used to form activator-supports useful in the present invention. Methods of contacting the solid oxide with the electron-withdrawing component, suitable electron withdrawing components and addition amounts, impregnation with metals or metal ions (e.g., zinc, nickel, vanadium, titanium, silver, copper, gallium, tin, tungsten, molybdenum, zirconium, and the like, or combinations thereof), and various calcining procedures and conditions are disclosed in, for example, U.S. Pat. Nos. 6,107,230, 6,165,929, 6,294,494, 6,300,271, 6,316,553, 6,355,594, 6,376,415, 6,388,017, 6,391,816, 6,395,666, 6,524,987, 6,548,441, 6,548,442, 6,576,583, 6,613,712, 6,632,894, 6,667,274, 6,750,302, 7,294,599, 7,601,665, 7,884,163, and 8,309,485, which are incorporated herein by reference in their entirety. Other suitable processes and procedures for preparing activator-supports (e.g., fluorided solid oxides and sulfated solid oxides) are well known to those of skill in the art.

The present invention can employ catalyst compositions containing catalyst component I, catalyst component II, an activator (one or more than one), and optionally, a co-catalyst. When present, the co-catalyst can include, but is not limited to, metal alkyl, or organometal, co-catalysts, with the metal encompassing boron, aluminum, zinc, and the like. Optionally, the catalyst systems provided herein can comprise a co-catalyst, or a combination of co-catalysts. For instance, alkyl boron, alkyl aluminum, and alkyl zinc compounds often can be used as co-catalysts in such catalyst systems. Representative boron compounds can include, but are not limited to, tri-n-butyl borane, tripropylborane, triethylborane, and the like, and this include combinations of two or more of these materials. While not being limited thereto, representative aluminum compounds (e.g., organoaluminum compounds) can include trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, and the like, as well as any combination thereof. Exemplary zinc compounds (e.g., organozinc compounds) that can be used as co-catalysts can include, but are not limited to, dimethylzinc, diethylzinc, dipropylzinc, dibutylzinc, dineopentylzinc, di(trimethylsilyl)zinc, di(triethylsilyl)zinc, di(triisoproplysilyl)zinc, di(triphenylsilyl)zinc, di(allyldimethylsilyl)zinc, di(trimethylsilylmethyl)zinc, and the like, or combinations thereof. Accordingly, in an aspect of this invention, the dual catalyst composition can comprise catalyst component I, catalyst component II, an activator-support, and an organoaluminum compound (and/or an organozinc compound).

In another aspect of the present invention, a catalyst composition is provided which comprises catalyst component I, catalyst component II, an activator-support, and an organoaluminum compound, wherein this catalyst composition is substantially free of aluminoxanes, organoboron or organoborate compounds, ionizing ionic compounds, and/or other similar materials; alternatively, substantially free of aluminoxanes; alternatively, substantially free or organoboron or organoborate compounds; or alternatively, substantially free of ionizing ionic compounds. In these aspects, the catalyst composition has catalyst activity, discussed herein, in the absence of these additional materials. For example, a catalyst composition of the present invention can consist essentially of catalyst component I, catalyst component II, an activator-support, and an organoaluminum compound, wherein no other materials are present in the catalyst composition which would increase/decrease the activity of the catalyst composition by more than 10% from the catalyst activity of the catalyst composition in the absence of said materials.

This invention further encompasses methods of making these catalyst compositions, such as, for example, contacting the respective catalyst components in any order or sequence. In one aspect, for example, the catalyst composition can be produced by a process comprising contacting, in any order, catalyst component I, catalyst component II, and the activator, while in another aspect, the catalyst composition can be produced by a process comprising contacting, in any order, catalyst component I, catalyst component II, the activator, and the co-catalyst.

Ethylene polymers (e.g., ethylene/α-olefin copolymers) can be produced from the disclosed catalyst systems using any suitable polymerization process using various types of polymerization reactors, polymerization reactor systems, and polymerization reaction conditions. One such polymerization process for polymerizing olefins in the presence of a catalyst composition of the present invention can comprise contacting the catalyst composition with ethylene and an α-olefin comonomer (one or more) in a polymerization reactor system under polymerization conditions to produce an ethylene polymer, wherein the catalyst composition can comprise, as disclosed herein, catalyst component I, catalyst component II, an activator, and an optional co-catalyst. This invention also encompasses any ethylene polymers produced by any of the polymerization processes disclosed herein.

As used herein, a "polymerization reactor" includes any polymerization reactor capable of polymerizing (inclusive of oligomerizing) olefin monomers and comonomers (one or more than one comonomer) to produce homopolymers, copolymers, terpolymers, and the like. The various types of polymerization reactors include those that can be referred to as a batch reactor, slurry reactor, gas-phase reactor, solution reactor, high pressure reactor, tubular reactor, autoclave reactor, and the like, or combinations thereof; or alternatively, the polymerization reactor system can comprise a slurry reactor, a gas-phase reactor, a solution reactor, or a combination thereof. The polymerization conditions for the various reactor types are well known to those of skill in the art. Gas phase reactors can comprise fluidized bed reactors or staged horizontal reactors. Slurry reactors can comprise vertical or horizontal loops. High pressure reactors can comprise autoclave or tubular reactors. Reactor types can include batch or continuous processes. Continuous processes can use intermittent or continuous product discharge. Polymerization reactor systems and processes also can include partial or full direct recycle of unreacted monomer, unreacted comonomer, and/or diluent.

A polymerization reactor system can comprise a single reactor or multiple reactors (2 reactors, more than 2 reactors) of the same or different type. For instance, the polymerization reactor system can comprise a slurry reactor, a gas-phase reactor, a solution reactor, or a combination of two or more of these reactors. Production of polymers in multiple reactors can include several stages in at least two separate polymerization reactors interconnected by a transfer device making it possible to transfer the polymers resulting from the first polymerization reactor into the second reactor. The desired polymerization conditions in one of the reactors can be different from the operating conditions of the other reactor(s). Alternatively, polymerization in multiple reactors can include the manual transfer of polymer from one reactor to subsequent reactors for continued polymerization. Multiple reactor systems can include any combination including, but not limited to, multiple loop reactors, multiple gas phase reactors, a combination of loop and gas phase reactors, multiple high pressure reactors, or a combination of high pressure with loop and/or gas phase reactors. The multiple reactors can be operated in series, in parallel, or both. Accordingly, the present invention encompasses polymerization reactor systems comprising a single reactor, comprising two reactors, and comprising more than two reactors. The polymerization reactor system can comprise a slurry reactor, a gas-phase reactor, a solution reactor, in certain aspects of this invention, as well as multi-reactor combinations thereof.

According to one aspect, the polymerization reactor system can comprise at least one loop slurry reactor comprising vertical or horizontal loops. Monomer, diluent, catalyst, and comonomer can be continuously fed to a loop reactor where polymerization occurs. Generally, continuous processes can comprise the continuous introduction of monomer/comonomer, a catalyst, and a diluent into a polymerization reactor and the continuous removal from this reactor of a suspension comprising polymer particles and the diluent. Reactor effluent can be flashed to remove the solid polymer from the liquids that comprise the diluent, monomer and/or comonomer. Various technologies can be used for this separation step including, but not limited to, flashing that can include any combination of heat addition and pressure reduction, separation by cyclonic action in either a cyclone or hydrocyclone, or separation by centrifugation.

A typical slurry polymerization process (also known as the particle form process) is disclosed, for example, in U.S. Pat. Nos. 3,248,179, 4,501,885, 5,565,175, 5,575,979, 6,239,235, 6,262,191, 6,833,415, and 8,822,608, each of which is incorporated herein by reference in its entirety.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used.

According to yet another aspect, the polymerization reactor system can comprise at least one gas phase reactor (e.g., a fluidized bed reactor). Such reactor systems can employ a continuous recycle stream containing one or more monomers continuously cycled through a fluidized bed in the presence of the catalyst under polymerization conditions. A recycle stream can be withdrawn from the fluidized bed and recycled back into the reactor. Simultaneously, polymer product can be withdrawn from the reactor and new or fresh monomer can be added to replace the polymerized monomer. Such gas phase reactors can comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. Representative gas phase reactors are disclosed in U.S. Pat. Nos. 5,352,749, 4,588,790, 5,436,304, 7,531,606, and 7,598,327, each of which is incorporated by reference in its entirety herein.

According to still another aspect, the polymerization reactor system can comprise a high pressure polymerization reactor, e.g., can comprise a tubular reactor or an autoclave reactor. Tubular reactors can have several zones where fresh monomer, initiators, or catalysts are added. Monomer can be entrained in an inert gaseous stream and introduced at one zone of the reactor. Initiators, catalysts, and/or catalyst components can be entrained in a gaseous stream and introduced at another zone of the reactor. The gas streams can be intermixed for polymerization. Heat and pressure can be employed appropriately to obtain optimal polymerization reaction conditions.

According to yet another aspect, the polymerization reactor system can comprise a solution polymerization reactor wherein the monomer/comonomer are contacted with the catalyst composition by suitable stirring or other means. A carrier comprising an inert organic diluent or excess monomer can be employed. If desired, the monomer/comonomer can be brought in the vapor phase into contact with the catalytic reaction product, in the presence or absence of liquid material. The polymerization zone can be maintained at temperatures and pressures that will result in the formation of a solution of the polymer in a reaction medium. Agitation can be employed to obtain better temperature control and to maintain uniform polymerization mixtures throughout the polymerization zone. Adequate means are utilized for dissipating the exothermic heat of polymerization.

The polymerization reactor system can further comprise any combination of at least one raw material feed system, at least one feed system for catalyst or catalyst components, and/or at least one polymer recovery system. Suitable reactor systems can further comprise systems for feedstock purification, catalyst storage and preparation, extrusion, reactor cooling, polymer recovery, fractionation, recycle, storage, loadout, laboratory analysis, and process control. Depending upon the desired properties of the ethylene polymer, hydrogen can be added to the polymerization reactor as needed (e.g., continuously or pulsed).

Polymerization conditions that can be controlled for efficiency and to provide desired polymer properties can include temperature, pressure, and the concentrations of various reactants. Polymerization temperature can affect catalyst productivity, polymer molecular weight, and molecular weight distribution. Various polymerization conditions can be held substantially constant, for example, for the production of a particular grade of the olefin polymer (or ethylene polymer). A suitable polymerization temperature can be any temperature below the de-polymerization temperature according to the Gibbs Free energy equation. Typically, this includes from 60° C. to 280° C., for example, or from 60° C. to 120° C., depending upon the type of polymerization reactor(s). In some reactor systems, the polymerization temperature generally can be within a range from 70° C. to 105° C., or from 75° C. to 100° C.

Suitable pressures will also vary according to the reactor and polymerization type. The pressure for liquid phase polymerizations in a loop reactor is typically less than 1000 psig (6.9 MPa). Pressure for gas phase polymerization is usually at 200 to 500 psig (1.4 MPa to 3.4 MPa). High pressure polymerization in tubular or autoclave reactors is generally run at 20,000 to 75,000 psig (138 to 517 MPa). Polymerization reactors can also be operated in a supercritical region occurring at generally higher temperatures and pressures. Operation above the critical point of a pressure/temperature diagram (supercritical phase) can offer advantages to the polymerization reaction process.

Olefin comonomers that can be employed with ethylene monomer and the catalyst compositions and polymerization processes of this invention typically can include olefin compounds having from 3 to 30 carbon atoms per molecule and having at least one olefinic double bond. In an aspect, the olefin comonomer can comprise a $C_3$-$C_{20}$ olefin; alternatively, a $C_3$-$C_{20}$ alpha-olefin; alternatively, a $C_3$-$C_{10}$ olefin; or alternatively, a $C_3$-$C_{10}$ alpha-olefin. In another aspect, the alpha-olefin comonomer can comprise 1-butene, 1-pentene, 1-hexene, 1-octene, 1-decene, styrene, or any combination thereof; alternatively, the comonomer can comprise 1-butene, 1-hexene, 1-octene, or any combination thereof; alternatively, the comonomer can comprise 1-butene; alternatively, the comonomer can comprise 1-hexene; or alternatively, the comonomer can comprise 1-octene.

EXAMPLES

The invention is further illustrated by the following examples, which are not to be construed in any way as imposing limitations to the scope of this invention. Various other aspects, embodiments, modifications, and equivalents thereof which, after reading the description herein, may suggest themselves to one of ordinary skill in the art without departing from the spirit of the present invention or the scope of the appended claims.

Melt index (MI, g/10 min) can be determined in accordance with ASTM D1238 at 190° C. with a 2,160 gram weight, and high load melt index (HLMI, g/10 min) was determined in accordance with ASTM D1238 at 190° C. with a 21,600 gram weight. Density was determined in grams per cubic centimeter (g/cm$^3$) on a compression molded sample, cooled at 15° C. per minute, and conditioned for 40 hours at room temperature in accordance with ASTM D1505 and ASTM D4703.

Molecular weights and molecular weight distributions were obtained using a PL-GPC 220 (Polymer Labs, an Agilent Company) system equipped with a IR4 detector (Polymer Char, Spain) and three Styragel HMW-6E GPC columns (Waters, MA) running at 145° C. The flow rate of the mobile phase 1,2,4-trichlorobenzene (TCB) containing 0.5 g/L 2,6-di-t-butyl-4-methylphenol (BHT) was set at 1 mL/min, and polymer solution concentrations were in the range of 1.0-1.5 mg/mL, depending on the molecular weight. Sample preparation was conducted at 150° C. for nominally 4 hr with occasional and gentle agitation, before the solutions were transferred to sample vials for injection. An injection volume of 200 μL was used. The integral calibration method was used to deduce molecular weights and molecular weight distributions using a Chevron Phillips Chemical Company's HDPE polyethylene resin, MARLEX® BHB5003, as the broad standard. The integral table of the broad standard was pre-determined in a separate experiment with SEC-MALS. Mn is the number-average molecular weight, Mw is the weight-average molecular weight, Mz is the z-average molecular weight, Mv is viscosity-average molecular weight, and Mp is the peak molecular weight (location, in molecular weight, of the highest point of the molecular weight distribution curve).

The respective LMW component and HMW component properties were determined by deconvoluting the molecular weight distribution (see e.g., FIGS. 3-4) of each polymer. The relative amounts of the LMW and HMW components (weight percentages) in the polymer were determined using a commercial software program (Systat Software, Inc., PEAK FIT v. 4.05). The other molecular weight parameters for the LMW and HMW components (e.g., Mn, Mw, Mz, etc., of each component) were determined by using the deconvoluted data from the PEAK FIT program, and applying a PEAK FIT Chromatography/Log Normal 4-Parameter (Area) Function and two peaks without any constraints in deconvolution, per below (where $a_0$=area; $a_1$=center; $a_2$=width ($>0$); and $a_3$=shape ($>0$, $\neq 1$)):

$$y = \frac{a_0 \sqrt{\ln(2)}\left(a\frac{2}{3}-1\right)}{a_2 a_3 \ln(a_3)\sqrt{\pi}\exp\left[\frac{\ln\left(a\frac{2}{3}\right)}{4\ln(2)}\right]} \exp\left[-\frac{\left(\ln(2)\ln\left(\frac{(x-a_1)\left(a\frac{2}{3}-1\right)}{a_2 a_3}+1\right)\right)^2}{\ln(a_3)^2}\right].$$

Short chain branch content and short chain branching distribution (SCBD) across the molecular weight distribution were determined via an IR5-detected GPC system (IR5-GPC) using the method established by Yu (Y. Yu, Macromolecular Symposium, 2020, 390, 1900014), wherein the GPC system was a PL220 GPC/SEC system (Polymer Labs, an Agilent company) equipped with three Styragel HMW-6E columns (Waters, MA) for polymer separation. A thermoelectric-cooled IR5 MCT detector (IR5) (Polymer Characterisation SA, Spain) was connected to the GPC columns via a hot-transfer line. Chromatographic data was obtained from two output ports of the IR5 detector. First, the analog signal goes from the analog output port to a digitizer before connecting to Computer "A" for molecular weight determinations via the Cirrus software (Polymer Labs, now an Agilent Company) and the integral calibration method using a HDPE Marlex™ BHB5003 resin (Chevron Phillips Chemical) as the molecular weight standard. The digital signals, on the other hand, go via a USB cable directly to Computer "B" where they are collected by a LabView data collection software provided by Polymer Char. Chromatographic conditions were set as follows: column oven temperature of 145° C.; flowrate of 1 mL/min; injection volume of 0.4 mL; and polymer concentration of about 2 mg/mL, depending on sample molecular weight. The temperatures for both the hot-transfer line and IR5 detector sample cell were set at 150° C., while the temperature of the electronics of the IR5 detector was set at 60° C. Short chain branching content was determined via an in-house method using the intensity ratio of $CH_3$ ($I_{CH3}$) to $CH_2$ ($I_{CH2}$) coupled with a calibration curve. The calibration curve was a plot of SCB content ($x_{SCB}$) as a function of the intensity ratio of $I_{CH3}/I_{CH2}$. To obtain a calibration curve, a group of polyethylene resins (no less than 5) of SCB level ranging from zero to ca. 32 SCB/1,000 total carbons (SCB Standards) were used. All these SCB Standards have known SCB levels and flat SCBD profiles pre-determined separately by NMR and the solvent-gradient fractionation coupled with NMR (SGF-NMR) methods. Using SCB calibration curves thus established, profiles of short chain branching distribution across the molecular weight distribution were obtained for resins fractionated by the IR5-GPC system under exactly the same chromatographic conditions as for these SCB standards. A relationship between the intensity ratio and the elution volume was converted into SCB distribution as a function of MWD using a predetermined SCB calibration curve (i.e., intensity ratio of $I_{CH3}/I_{CH2}$ vs. SCB content) and MW calibration curve (i.e., molecular weight vs. elution time) to convert the intensity ratio of Imam and the elution time into SCB content and the molecular weight, respectively.

Metals content, such as the amount of catalyst residue in the ethylene polymer or film/article, can be determined by ICP analysis on a PerkinElmer Optima 8300 instrument. Polymer samples can be ashed in a Thermolyne furnace with sulfuric acid overnight, followed by acid digestion in a HotBlock with HCl and $HNO_3$ (3:1 v:v).

Examples 1-4

Fluorided silica-coated alumina activator-supports used in Examples 1-4 were prepared as follows. A slurry was made by mixing 400 mL of water and 100 g of silica-coated alumina (40 wt. % alumina, a surface area of 450 m²/g, a pore volume of 1.3 mL/g, and an average particle size of 35 microns). A solution of concentrated hydrofluoric acid (5 g HF) was mixed into the slurry, and the resulting slurry was then spray dried to a dry flowable powder. Calcining was performed at 600° C. by fluidizing the fluorided silica-coated alumina in dry nitrogen for 3 hr, followed by cooling to room temperature while still being fluidized under nitrogen. Afterward, the fluorided silica-coated alumina (FSCA) was collected and stored under dry nitrogen, and was used without exposure to the atmosphere.

Structures of the metallocene compounds used in Examples 1-4 are shown below:

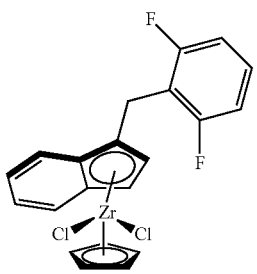

IE-4

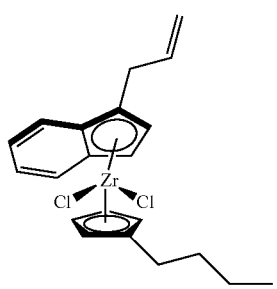

CE-4

CE-6

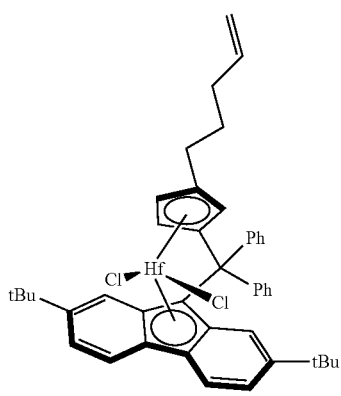

Table I summarizes certain polymerization reaction conditions for Examples 1-4, and the following polymerization procedure was used for Examples 1-4. In a glove box, a syringe was charged with the following reagents in the following order: 250 mg FSCA, ~2 mL hexanes, 0.5 mL TIBA (triisobutylaluminum, 1 M in hexanes), and a total of 2 mg of metallocenes (1 mg/mL slurry in hexanes). The mixture was contacted for 2-5 min prior to being injected into an isobutane purged 1-gallon autoclave reactor. The reactor was sealed and charged with 2 L of isobutane. The mixture was heated to the desired temperature over 5-7 min with stirring (~1000 rpm). When the mixture reached 8° C. below the prescribed temperature target, the desired amount of 1-hexene was added as the reactor was charged with ethylene to the targeted pressure (3 mg hydrogen was used in Example 3, and 2 mg hydrogen was used in Example 4). The reaction was continued for 30 min while maintaining the prescribed temperature and pressure with pressurized ethylene as needed. After 30 min, the reactor was vented and flushed with nitrogen. The reactor solids were removed and dried under vacuum for a minimum of 3 hr prior to testing.

Figure 3:
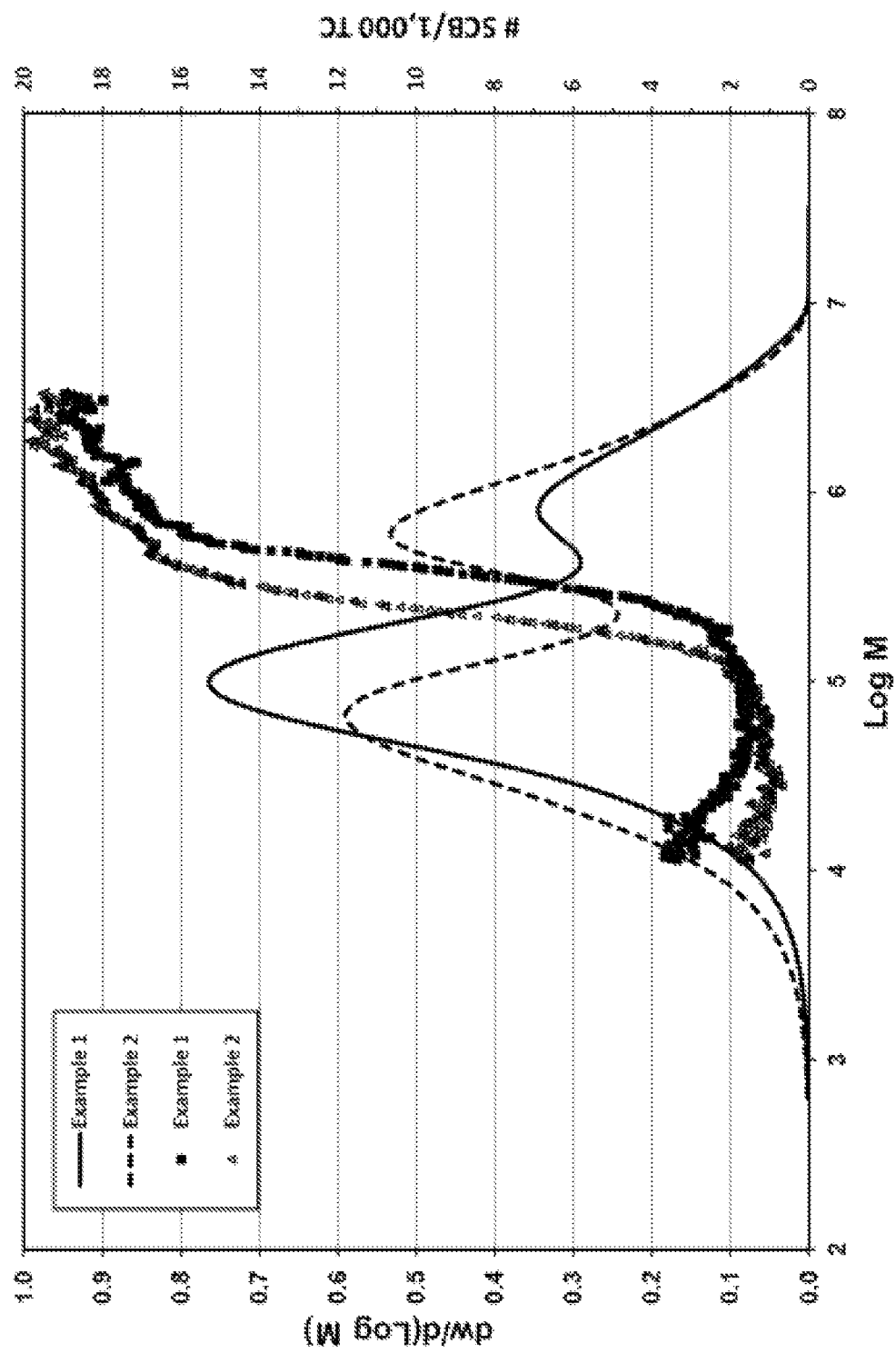
FIG. 3 presents a plot of the short chain branch distributions across the molecular weight distributions of the polymers of Examples 1-2.
Figure 4:
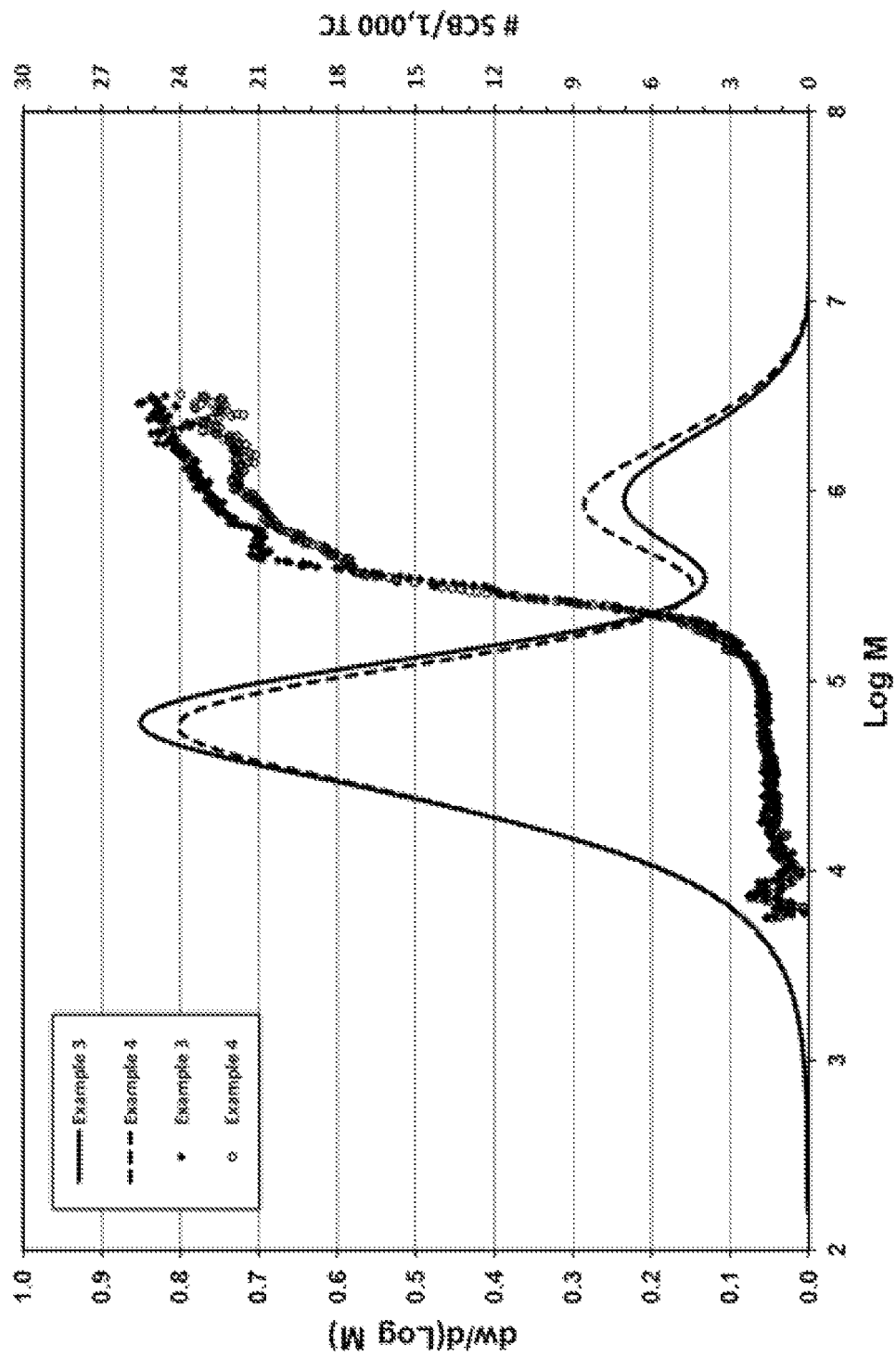
FIG. 4 presents a plot of the short chain branch distributions across the molecular weight distributions of the polymers of Examples 3-4.

Tables summarize polymer properties of the ethylene copolymers of Examples 1-4, and FIGS. 3-4 illustrates the bimodal molecular weight distributions (amount of polymer versus the logarithm of molecular weight) and short chain branch distributions (SCBD) of these polymers. The bimodal molecular weight distributions from each of these polymers were deconvoluted into their respective high molecular weight and low molecular weight components (LMW and HMW) as described herein. The molecular weight parameters for the LMW and HMW components (e.g., $M_n$, $M_w$, and $M_z$ of each component) of each example were determined by using the deconvoluted data from the PEAK FIT program, and are listed in Table III, as well as the overall polymer molecular weight properties.

The number of short chain branches (SCBs) per 1000 total carbon atoms of each polymer at various positions along the bimodal molecular weight distribution are summarized in Table II and Table IV. As shown in Table V, and unexpectedly, the polymers of Examples 2-4 had much higher relative SCB content in the high molecular weight fraction of the polymer versus the low molecular weight fraction of the polymer, as compared to Example 1. The ratios of the number of SCBs per 1000 total carbon atoms at $M_z$ to the number of SCBs per 1000 total carbon atoms at $M_n$ ranged from 14 to 17 for Examples 2-4, and were 38-57% greater than the same ratio of 10.7 for Example 1. Also in Table V, the ratios of the number of SCBs per 1000 total carbon atoms at $M_n$ of the HMW component to the number of SCBs per 1000 total carbon atoms at $M_n$ of the LMW component ranged from 14 to 19 for Examples 2-4, and were 46-89% greater than the same ratio of 9.7 for Example 1.

Similarly, Table V also shows unexpectedly higher ratios of the number of SCBs per 1000 total carbon atoms at $M_p$ of the HMW component to the number of SCBs per 1000 total carbon atoms at $M_p$ of the LMW component, which ranged from 12 to 13 for Examples 2-4, and were 13-17% greater than the same ratio of 10.9 for Example 1. Lastly, the ratios of the number of SCBs per 1000 total carbon atoms at $M_p$ of the HMW component to the number of SCBs per 1000 total carbon atoms at $M_z$ of the LMW component ranged from 10 to 12 for Examples 2-4, and were 57-67% greater than the same ratio of 6.9 for Example 1.

In summary, Examples 2-4 demonstrate bimodal ethylene-based copolymers with surprisingly low levels of SCB content in the low molecular weight fraction of the of the polymer in combination with unexpectedly high levels of SCB content in the high molecular weight fraction of the polymer. Such polymers can be particularly useful in a variety of end-use applications, such as injection molding or blow molding, in which improvements in environmental stress crack resistance (ESCR), PENT slow crack growth resistance (ASTM F1473), or natural draw ratio (NDR) are desired.

TABLE I

| Example | Catalyst I, amount | Catalyst II, amount | Temperature (° C.) | Pressure (psig) | 1-hexene (g) | Polymer (g) |
|---|---|---|---|---|---|---|
| 1 | CE-4, 0.5 mg | CE-6, 1.5 mg | 95 | 420 | 20 | 200 |
| 2 | IE-4, 0.5 mg | CE-6, 1.5 mg | 95 | 420 | 20 | 225 |
| 3 | IE-4, 0.9 mg | CE-6, 1.1 mg | 90 | 390 | 36 | 156 |
| 4 | IE-4, 0.75 mg | CE-6, 1.25 mg | 90 | 390 | 30 | 146 |

TABLE II

| Example | HLMI (g/10 min) | Density (g/cc) | D10/1000 (g/mol) | D85/1000 (g/mol) | SCBs @ D10 |
|---|---|---|---|---|---|
| 1 | 0.51 | 0.9314 | 1382 | 39.8 | 17.3 |
| 2 | 0.19 | 0.9292 | 1400 | 27.3 | 19.0 |
| 3 | 11.8 | 0.9387 | 927 | 20.6 | 22.7 |
| 4 | 7.7 | 0.9373 | 1063 | 20.3 | 21.7 |

TABLE III

| Example | wt. % | Mn/1000 (g/mol) | Mw/1000 (g/mol) | Mz/1000 (g/mol) | Mv/1000 (g/mol) | Mp/1000 (g/mol) | Mw/Mn |
|---|---|---|---|---|---|---|---|
| 1 | — | 59.1 | 492.3 | 2188.4 | 372.2 | 99.0 | 8.33 |
| 1—HMW | 30.9 | 738.4 | 1526.9 | 4017.3 | 1352.5 | 834.9 | 2.07 |
| 1—LMW | 69.1 | 46.8 | 106.4 | 173.3 | 98.3 | 102.0 | 2.27 |
| 2 | — | 43.9 | 516.4 | 1961.8 | 396.4 | 65.6 | 11.77 |
| 2—HMW | 45.7 | 558.6 | 1152.3 | 3138.6 | 1020.1 | 631.4 | 2.06 |
| 2—LMW | 54.3 | 24.0 | 61.5 | 97.7 | 56.8 | 65.8 | 2.57 |
| 3 | — | 27.9 | 303.4 | 1855.9 | 213.4 | 60.3 | 10.87 |
| 3—HMW | 20.8 | 610.6 | 1215.9 | 2234.1 | 1113.1 | 919.2 | 1.99 |
| 3—LMW | 79.2 | 26.1 | 64.5 | 108.2 | 59.3 | 61.5 | 2.47 |
| 4 | — | 28.7 | 346.3 | 1938.0 | 245.1 | 58.0 | 12.07 |
| 4—HMW | 24.8 | 650.0 | 1231.2 | 2314.2 | 1127.0 | 869.4 | 1.89 |
| 4—LMW | 75.4 | 25.0 | 62.3 | 105.6 | 57.2 | 59.0 | 2.50 |

TABLE IV

| Example | SCBs @ Mn | SCBs @ Mw | SCBs @ Mz | SCBs @ Mp |
|---|---|---|---|---|
| 1 | 1.7 | 13.7 | 18.4 | — |
| 1—HMW | 16.8 | 17.9 | — | 17.1 |
| 1—LMW | 1.7 | 1.5 | 2.5 | 1.6 |
| 2 | 1.2 | 16.7 | 19.0 | — |
| 2—HMW | 17.0 | 18.6 | 19.4 | 17.2 |
| 2—LMW | 0.9 | 1.2 | 1.5 | 1.4 |
| 3 | 1.7 | 12.2 | 24.8 | — |
| 3—HMW | 21.2 | 23.6 | 23.5 | 22.8 |
| 3—LMW | 1.5 | 1.9 | 2.0 | 1.8 |
| 4 | 1.3 | 15.8 | 21.8 | — |
| 4—HMW | 20.3 | 21.9 | 23.1 | 21.1 |
| 4—LMW | 1.3 | 1.6 | 1.9 | 1.7 |

TABLE V

| Example | SCBs @ Mw/ SCBs @ Mn | SCBs @ Mz/ SCBs @ Mn | SCBs @ Mp-HMW/ SCBs @ Mp-LMW | SCBs @ Mn-HMW/ SCBs @ Mn-LMW | SCBs @ Mp-HMW/ SCBs @ Mz-LMW |
|---|---|---|---|---|---|
| 1 | 7.97 | 10.69 | 10.87 | 9.66 | 6.91 |
| 2 | 13.83 | 15.71 | 12.62 | 18.27 | 11.52 |
| 3 | 7.27 | 14.77 | 12.68 | 14.13 | 11.19 |
| 4 | 12.15 | 16.78 | 12.31 | 16.25 | 10.85 |

The invention is described above with reference to numerous aspects and specific examples. Many variations will suggest themselves to those skilled in the art in light of the above detailed description. All such obvious variations are within the full intended scope of the appended claims. Other aspects of the invention can include, but are not limited to, the following (aspects are described as "comprising" but, alternatively, can "consist essentially of" or "consist of"):

Aspect 1. An ethylene polymer having (or characterized by):
a density in a range from 0.92 to 0.955 g/cm³;
a HLMI of less than or equal to 35 g/10 min; and
a ratio of a number of short chain branches (SCBs) per 1000 total carbon atoms at Mz to a number of SCBs per 1000 total carbon atoms at Mn in a range from 11.5 to 22.

Aspect 2. An ethylene polymer having (or characterized by):
a density in a range from 0.92 to 0.955 g/cm³;
a HLMI of less than or equal to 35 g/10 min; and
a higher molecular weight component (HMW) and a lower molecular weight (LMW) component, wherein:
a ratio of a number of short chain branches (SCBs) per 1000 total carbon atoms at Mn of the HMW component to a number of SCBs per 1000 total carbon atoms at Mn of the LMW component is in a range from 10.5 to 22.

Aspect 3. The polymer defined in aspect 1 or 2, wherein the ethylene polymer has a molecular weight at D10 in any range disclosed herein, e.g., from 750,000 to 2,000,000, from 800,000 to 1,750,000, from 850,000 to 2,000,000, or from 900,000 to 1,750,000 g/mol.

Aspect 4. The polymer defined in any one of the preceding aspects, wherein the ethylene polymer has a molecular weight at D85 in any range disclosed herein, e.g., from 14,000 to 50,000, from 15,000 to 40,000, from 16,000 to 38,000, or from 17,000 to 35,000 g/mol.

Aspect 5. The polymer defined in any one of the preceding aspects, wherein the ethylene polymer has a number of SCBs per 1000 total carbon atoms at D10 in any range disclosed herein, e.g., from 9 to 30, from 12 to 28, from 14 to 27, or from 16 to 25.

Aspect 6. The polymer defined in any one of the preceding aspects, wherein the density is in any range disclosed herein, e.g., from 0.92 to 0.95, from 0.92 to 0.94, from 0.925 to 0.955, from 0.925 to 0.95, or from 0.925 to 0.943 g/cm³.

Aspect 7. The polymer defined in any one of the preceding aspects, wherein the HLMI is in any range disclosed herein, e.g., less than or equal to 30 g/10 min, less than or equal to 25 g/10 min, less than or equal to 20 g/10 min, or less than or equal to 15 g/10 min.

Aspect 8. The polymer defined in any one of the preceding aspects, wherein the ratio of the number of SCBs per 1000 total carbon atoms at Mz to the number of SCBs per 1000 total carbon atoms at Mn is in any range disclosed herein, e.g., from 11.5 to 22, from 12 to 21, from 12 to 18, from 13 to 22, or from 13 to 19.

Aspect 9. The polymer defined in any one of the preceding aspects, wherein the ethylene polymer has a Mw in any range disclosed herein, e.g., from 200,000 to 800,000, from 225,000 to 725,000, from 250,000 to 600,000, or from 275,000 to 575,000 g/mol.

Aspect 10. The polymer defined in any one of the preceding aspects, wherein the ethylene polymer has a Mp in any range disclosed herein, e.g., from 30,000 to 90,000, from 35,000 to 85,000, from 40,000 to 80,000, or from 45,000 to 75,000 g/mol.

Aspect 11. The polymer defined in any one of the preceding aspects, wherein the ethylene polymer has a Mn in any range disclosed herein, e.g., from 15,000 to 60,000, from 18,000 to 57,000, from 22,000 to 53,000, or from 25,000 to 50,000 g/mol.

Aspect 12. The polymer defined in any one of the preceding aspects, wherein the ethylene polymer has a Mz in any range disclosed herein, e.g., from 1,300,000 to 3,100,000, from 1,400,000 to 3,000,000, from 1,500,000 to 2,500,000, or from 1,700,000 to 2,200,000 g/mol.

Aspect 13. The polymer defined in any one of the preceding aspects, wherein the ethylene polymer has a ratio of Mw/Mn in any range disclosed herein, e.g., from 6 to 25, from 7 to 20, from 7 to 18, from 8 to 15, or from 9 to 13.

Aspect 14. The polymer defined in any one of the preceding aspects, wherein the ethylene polymer has less than 0.008 long chain branches (LCBs) per 1000 total carbon atoms, e.g., less than 0.005 LCBs, or less than 0.003 LCBs.

Aspect 15. The polymer defined in any one of the preceding aspects, wherein the ethylene polymer has a higher molecular weight component (HMW) and a lower molecular weight (LMW) component, wherein an amount of the LMW component, based on the total polymer, is in any range of weight percentages disclosed herein, e.g., from 40 to 90 wt. %, from 40 to 85 wt. %, from 45 to 90 wt. %, from 45 to 85 wt. %, or from 50 to 85 wt. %.

Aspect 16. The polymer defined in any one of the preceding aspects, wherein the HMW component has a Mn in any range disclosed herein, e.g., from 400,000 to 800,000, from 450,000 to 750,000, or from 500,000 to 700,000 g/mol.

Aspect 17. The polymer defined in any one of the preceding aspects, wherein the LMW component has a Mz in any range disclosed herein, e.g., from 70,000 to 200,000, from 70,000 to 170,000, from 75,000 to 150,000, or from 80,000 to 130,000 g/mol.

Aspect 18. The polymer defined in any one of the preceding aspects, wherein the HMW component has a Mp in any range disclosed herein, e.g., from 400,000 to 1,100,000, from 500,000 to 1,100,000, or from 550,000 to 1,000,000 g/mol.

Aspect 19. The polymer defined in any one of the preceding aspects, wherein the ratio of the number of SCBs per 1000 total carbon atoms at Mn of the HMW component to the number of SCBs per 1000 total carbon atoms at Mn of the LMW component is in any range disclosed herein, e.g., from 10.5 to 22, from 11 to 22, from 11 to 21, from 12 to 22, from 12 to 20, or from 13 to 19.

Aspect 20. The polymer defined in any one of the preceding aspects, wherein a ratio of a number of SCBs per 1000 total carbon atoms at Mp of the HMW component to a number of SCBs per 1000 total carbon atoms at Mp of the LMW component is in any range disclosed herein, e.g., from 11 to 18, from 11 to 14, from 11.5 to 16, or from 11.5 to 15.

Aspect 21. The polymer defined in any one of the preceding aspects, wherein a ratio of a number of SCBs per 1000 total carbon atoms at Mp of the HMW component to a number of SCBs per 1000 total carbon atoms at Mz of the LMW component is in any range disclosed herein, e.g., from 7.5 to 18, from 8 to 16, from 9 to 14, or from 10 to 12.

Aspect 22. The polymer defined in any one of the preceding aspects, wherein the ethylene polymer has a number of SCBs per 1000 total carbon atoms at Mz in any range disclosed herein, e.g., from 10 to 30, from 12 to 30, from 15 to 28, or from 17 to 26.

Aspect 23. The polymer defined in any one of the preceding aspects, wherein the ethylene polymer has a bimodal molecular weight distribution.

Aspect 24. The polymer defined in any one of the preceding aspects, wherein the ethylene polymer is a single reactor product, e.g., not a post-reactor blend of two polymers, for instance, having different molecular weight characteristics.

Aspect 25. The polymer defined in any one of the preceding aspects, wherein the ethylene polymer comprises an ethylene/α-olefin copolymer.

Aspect 26. The polymer defined in any one of the preceding aspects, wherein the ethylene polymer comprises an ethylene/1-butene copolymer, an ethylene/1-hexene copolymer, and/or an ethylene/1-octene copolymer.

Aspect 27. The polymer defined in any one of the preceding aspects, wherein the ethylene polymer comprises an ethylene/1-hexene copolymer.

Aspect 28. The polymer defined in any one of the preceding aspects, wherein the ethylene polymer contains, independently, less than 0.1 ppm (by weight), less than 0.08 ppm, less than 0.05 ppm, or less than 0.03 ppm, of Mg, V, Ti, or Cr. Aspect 29. An article comprising the ethylene polymer defined in any one of the preceding aspects.

Aspect 30. An article comprising the ethylene polymer defined in any one of aspects 1-28, wherein the article is an agricultural film, an automobile part, a bottle, a container for chemicals, a drum, a fiber or fabric, a food packaging film or container, a food service article, a fuel tank, a geomembrane, a household container, a liner, a molded product, a medical device or material, an outdoor storage product, outdoor play equipment, a pipe, a sheet or tape, a toy, or a traffic barrier.

Aspect 31. A polymerization process, the process comprising contacting a catalyst composition with ethylene and an α-olefin comonomer in a polymerization reactor system under polymerization conditions to produce an ethylene polymer, wherein the ethylene polymer is defined in any one of aspects 1-28, and wherein the catalyst composition comprises catalyst component I comprising any unbridged metallocene compound disclosed herein, catalyst component II comprising any bridged metallocene compound disclosed herein, any activator disclosed herein, and optionally, any co-catalyst disclosed herein.

Aspect 32. The process defined in aspect 31, wherein catalyst component II comprises a bridged zirconium or hafnium based metallocene compound.

Aspect 33. The process defined in aspect 31, wherein catalyst component II comprises a bridged zirconium or hafnium based metallocene compound with an alkenyl substituent.

Aspect 34. The process defined in aspect 31, wherein catalyst component II comprises a bridged zirconium or hafnium based metallocene compound with an alkenyl substituent and a fluorenyl group.

Aspect 35. The process defined in aspect 31, wherein catalyst component II comprises a bridged zirconium or hafnium based metallocene compound with a cyclopentadienyl group and a fluorenyl group, and with an alkenyl substituent on the bridging group and/or on the cyclopentadienyl group.

Aspect 36. The process defined in any one of aspects 31-35, wherein catalyst component II comprises a bridged metallocene compound having an aryl group substituent on the bridging group.

Aspect 37. The process defined in any one of aspects 31-36, wherein catalyst component I comprises an unbridged metallocene compound containing two indenyl groups or an indenyl group and a cyclopentadienyl group, wherein at least one indenyl group has at least one halogen-substituted hydrocarbyl substituent with at least two halogen atoms.

Aspect 38. The process defined in any one of aspects 31-36, wherein catalyst component I comprises an unbridged metallocene compound containing two indenyl groups, wherein at least one indenyl group has at least one halogen-substituted hydrocarbyl substituent with at least two halogen atoms.

Aspect 39. The process defined in any one of aspects 31-36, wherein catalyst component I comprises an unbridged metallocene compound containing an indenyl group and a cyclopentadienyl group, wherein the indenyl group has at least one halogen-substituted hydrocarbyl substituent with at least two halogen atoms.

Aspect 40. The process defined in any one of aspects 37-39, wherein the halogen-substituted hydrocarbyl substituent comprises an aryl group.

Aspect 41. The process defined in any one of aspects 37-40, wherein each halogen is fluorine.

Aspect 42. The process defined in any one of aspects 37-41, wherein the unbridged metallocene compound contains zirconium.

Aspect 43. The process defined in any one of aspects 31-42, wherein the activator comprises an activator-support, an aluminoxane compound, an organoboron or organoborate compound, an ionizing ionic compound, or any combination thereof.

Aspect 44. The process defined in any one of aspects 31-43, wherein the activator comprises an aluminoxane compound.

Aspect 45. The process defined in any one of aspects 31-43, wherein the activator comprises an organoboron or organoborate compound.

Aspect 46. The process defined in any one of aspects 31-43, wherein the activator comprises an ionizing ionic compound.

Aspect 47. The process defined in any one of aspects 31-43, wherein the activator comprises an activator-support, the activator-support comprising any solid oxide treated with any electron-withdrawing anion disclosed herein.

Aspect 48. The process defined in any one of aspects 31-43, wherein the activator comprises fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided-chlorided silica-coated alumina, fluorided silica-coated alumina, sulfated silica-coated alumina, phosphated silica-coated alumina, or any combination thereof.

Aspect 49. The process defined in any one of aspects 31-43, wherein the activator comprises a fluorided solid oxide and/or a sulfated solid oxide.

Aspect 50. The process defined in any one of aspects 31-49, wherein the catalyst composition comprises a co-catalyst, e.g., any co-catalyst disclosed herein.

Aspect 51. The process defined in any one of aspects 31-50, wherein the co-catalyst comprises any organoaluminum compound disclosed herein.

Aspect 52. The process defined in aspect 51, wherein the organoaluminum compound comprises trimethylaluminum, triethylaluminum, triisobutylaluminum, or a combination thereof.

Aspect 53. The process defined in any one of aspects 47-52, wherein the catalyst composition comprises catalyst component I, catalyst component II, a solid oxide treated with an electron-withdrawing anion, and an organoaluminum compound.

Aspect 54. The process defined in any one of aspects 47-53, wherein the catalyst composition is substantially free of aluminoxane compounds, organoboron or organoborate compounds, ionizing ionic compounds, or combinations thereof Aspect 55. The process defined in any one of aspects 31-54, wherein a weight ratio of catalyst component I to catalyst component II in the catalyst composition is in any range disclosed herein, e.g., from 10:1 to 1:10, from 5:1 to 1:5, or from 2:1 to 1:2.

Aspect 56. The process defined in any one of aspects 31-55, wherein the catalyst composition is produced by a process comprising contacting, in any order, catalyst component I, catalyst component II, and the activator, or contacting, in any order, catalyst component I, catalyst component II, the activator, and the co-catalyst.

Aspect 57. The process defined in any one of aspects 31-56, wherein the α-olefin comonomer comprises a $C_3$-$C_{20}$ α-olefin, or alternatively, a $C_3$-$C_{10}$ α-olefin.

Aspect 58. The process defined in any one of aspects 31-57, wherein the α-olefin comonomer comprises 1-butene, 1-hexene, 1-octene, or a mixture thereof.

Aspect 59. The process defined in any one of aspects 31-58, wherein the polymerization reactor system comprises a batch reactor, a slurry reactor, a gas-phase reactor, a solution reactor, a high pressure reactor, a tubular reactor, an autoclave reactor, or a combination thereof.

Aspect 60. The process defined in any one of aspects 31-59, wherein the polymerization reactor system comprises a slurry reactor, a gas-phase reactor, a solution reactor, or a combination thereof.

Aspect 61. The process defined in any one of aspects 31-60, wherein the polymerization reactor system comprises a loop slurry reactor.

Aspect 62. The process defined in any one of aspects 31-61, wherein the polymerization reactor system comprises a single reactor.

Aspect 63. The process defined in any one of aspects 31-61, wherein the polymerization reactor system comprises 2 reactors.

Aspect 64. The process defined in any one of aspects 31-61, wherein the polymerization reactor system comprises more than 2 reactors.

Aspect 65. The process defined in any one of aspects 31-64, wherein the polymerization conditions comprise a polymerization reaction temperature in a range from 60° C. to 120° C. and a reaction pressure in a range from 200 to 1000 psig (1.4 to 6.9 MPa).

Aspect 66. The process defined in any one of aspects 31-65, wherein the polymerization conditions are substantially constant, e.g., for a particular polymer grade.

Aspect 67. The process defined in any one of aspects 31-66, wherein no hydrogen is added to the polymerization reactor system.

Aspect 68. The process defined in any one of aspects 31-66, wherein hydrogen is added to the polymerization reactor system.

Aspect 69. The process defined in any one of aspects 31-68, wherein the ethylene polymer produced is defined in any one of aspects 1-28.

Aspect 70. An ethylene polymer produced by the polymerization process defined in any one of aspects 31-68.

Aspect 71. An ethylene polymer defined in any one of aspects 1-28 produced by the process defined in any one of aspects 31-68.

Aspect 72. An article of manufacture comprising the polymer defined in aspect 70 or 71.

We claim:

1. An ethylene polymer having:
a density in a range from 0.92 to 0.955 g/cm$^3$;
a HLMI of less than or equal to 35 g/10 min; and
a ratio of a number of short chain branches (SCBs) per 1000 total carbon atoms at Mz to a number of SCBs per 1000 total carbon atoms at Mn in a range from 11.5 to 22.

2. An article comprising the ethylene polymer of claim 1.

3. The article of claim 2, wherein the ethylene polymer comprises an ethylene/1-butene copolymer, an ethylene/1-hexene copolymer, and/or an ethylene/1-octene copolymer.

4. The polymer of claim 1, wherein:
the density is in a range from 0.92 to 0.95 g/cm$^3$;
the HLMI is less than or equal to 20 g/10 min; and
the ratio of the number of SCBs per 1000 total carbon atoms at Mz to the number of SCBs per 1000 total carbon atoms at Mn is in a range from 12 to 21.

5. The polymer of claim 4, wherein the ethylene polymer has:
a molecular weight at D10 in a range from 750,000 to 2,000,000 g/mol;
a molecular weight at D85 in a range from 14,000 to 50,000; and
a number of SCBs per 1000 total carbon atoms at D10 in a range from 9 to 30.

6. The polymer of claim 4, wherein the ethylene polymer has a number of SCBs per 1000 total carbon atoms at Mz in a range from 10 to 30.

7. The polymer of claim 1, wherein:
the ethylene polymer has a bimodal molecular weight distribution; and
the ethylene polymer contains less than 0.1 ppm by weight, independently, of Mg, V, Ti, and Cr.

8. The polymer of claim 1, wherein the ethylene polymer has:
a Mw in a range from 200,000 to 800,000 g/mol; and
a Mn in a range from 15,000 to 60,000 g/mol.

9. An article comprising the ethylene polymer of claim 8, wherein the ratio of the number of SCBs per 1000 total carbon atoms at Mz to the number of SCBs per 1000 total carbon atoms at Mn is in a range from 13 to 19.

10. An ethylene polymer having:
a density in a range from 0.92 to 0.955 g/cm$^3$;
a HLMI of less than or equal to 35 g/10 min; and
a higher molecular weight component (HMW) and a lower molecular weight (LMW) component, wherein:
a ratio of a number of SCBs per 1000 total carbon atoms at Mn of the HMW component to a number of SCBs per 1000 total carbon atoms at Mn of the LMW component is in a range from 10.5 to 22.

11. An article comprising the ethylene polymer of claim 10.

12. The polymer of claim 10, wherein:
the density is in a range from 0.92 to 0.95 g/cm$^3$;
the HLMI is less than or equal to 20 g/10 min; and
the ratio of the number of SCBs per 1000 total carbon atoms at Mn of the HMW component to the number of SCBs per 1000 total carbon atoms at Mn of the LMW component is in a range from 11 to 21.

13. The polymer of claim 12, wherein:
a ratio of a number of SCBs per 1000 total carbon atoms at Mp of the HMW component to a number of SCBs per 1000 total carbon atoms at Mp of the LMW component is in a range from 11 to 18; and
a ratio of a number of SCBs per 1000 total carbon atoms at Mp of the HMW component to a number of SCBs per 1000 total carbon atoms at Mz of the LMW component is in a range from 7.5 to 18.

14. The polymer of claim 10, wherein:
a ratio of a number of SCBs per 1000 total carbon atoms at Mp of the HMW component to a number of SCBs per 1000 total carbon atoms at Mp of the LMW component is in a range from 11.5 to 16; and
ratio of a number of SCBs per 1000 total carbon atoms at Mp of the HMW component to a number of SCBs per 1000 total carbon atoms at Mz of the LMW component is in a range from 8 to 16.

15. The polymer of claim 14, wherein the ethylene polymer comprises an ethylene/1-butene copolymer, an ethylene/1-hexene copolymer, and/or an ethylene/1-octene copolymer.

16. The polymer of claim 10, wherein:
the HMW component has a Mn in a range from 400,000 to 800,000 g/mol; and
the LMW component has a Mz in a range from 70,000 to 200,000 g/mol.

17. The polymer of claim 16, wherein an amount of the LMW component, based on the total polymer, is in a range of from 45 to 85 wt. %.

18. A polymerization process, the process comprising contacting a catalyst composition with ethylene and an α-olefin comonomer in a polymerization reactor system under polymerization conditions to produce an ethylene polymer, wherein the ethylene polymer has:
a density in a range from 0.92 to 0.955 g/cm$^3$;
a HLMI of less than or equal to 35 g/10 min; and
a ratio of a number of short chain branches (SCBs) per 1000 total carbon atoms at Mz to a number of SCBs per 1000 total carbon atoms at Mn in a range from 11.5 to 22; and
the catalyst composition comprises:
an unbridged metallocene compound containing two indenyl groups or an indenyl group and a cyclopentadienyl group, wherein at least one indenyl group has at least one halogen-substituted hydrocarbyl substituent with at least two halogen atoms;
a bridged metallocene compound with a cyclopentadienyl group and fluorenyl group, and an alkenyl substituent on the cyclopentadienyl group and/or on the bridging group;
an activator; and
optionally, a co-catalyst.

19. The process of claim 18, wherein the activator comprises a fluorided solid oxide and/or a sulfated solid oxide.

20. The process of claim 18, wherein the polymerization reactor system comprises a slurry reactor, gas-phase reactor, solution reactor, or a combination thereof.

* * * * *